United States Patent
Nakagawa et al.

(10) Patent No.: US 11,412,100 B2
(45) Date of Patent: Aug. 9, 2022

(54) IMAGE FORMING SYSTEM

(71) Applicant: CANON KABUSHIKI KAISHA, Tokyo (JP)

(72) Inventors: Tomohito Nakagawa, Chiba (JP); Teppei Nagata, Chiba (JP); Yukihiro Soeta, Kanagawa (JP); Shogo Terakawa, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/320,108

(22) Filed: May 13, 2021

(65) Prior Publication Data
US 2021/0377406 A1  Dec. 2, 2021

(30) Foreign Application Priority Data

May 26, 2020  (JP) .............................. JP2020-091505
Jan. 26, 2021  (JP) .............................. JP2021-010202

(51) Int. Cl.
*H04N 1/04* (2006.01)
*H04N 1/00* (2006.01)
*H04N 1/409* (2006.01)

(52) U.S. Cl.
CPC ..... *H04N 1/00615* (2013.01); *H04N 1/00559* (2013.01); *H04N 1/00602* (2013.01); *H04N 1/409* (2013.01)

(58) Field of Classification Search
CPC .......... H04N 1/00615; H04N 1/00559; H04N 1/00602; H04N 1/409
See application file for complete search history.

(56) References Cited

U.S. PATENT DOCUMENTS

| 7,385,169 | B2 * | 6/2008 | Saitou | H04N 1/0318 |
| | | | | 358/514 |
| 7,460,279 | B2 | 12/2008 | Iwasaki | 358/450 |
| 2006/0050951 | A1 | 3/2006 | Iwasaki | 382/151 |
| 2008/0297857 | A1 | 12/2008 | Ishikawa et al. | 358/498 |

(Continued)

FOREIGN PATENT DOCUMENTS

| JP | 2006-109406 | 4/2006 |
| JP | 2020-019150 | 2/2020 |

OTHER PUBLICATIONS

Extended European Search Report dated Oct. 1, 2021 in counterpart EP Application No. 21175551.7.
U.S. Appl. No. 17/322,786, filed May 17, 2021.

*Primary Examiner* — Cheukfan Lee
(74) *Attorney, Agent, or Firm* — Venable LLP

(57) ABSTRACT

An image forming system including: a conveyance unit configured to convey a first sheet on which an image has been formed by an image forming portion; a reading unit including a reading sensor configured to read the first sheet being conveyed by the conveyance unit through a transparent member at a reading position; a guide member configured to cover a reference member on a side opposite to the reading sensor with respect to the transparent member; and a controller configured to perform shading correction on a result of reading the first sheet based on image data obtained by the reading unit reading the reference member through the transparent member, and to control, based on an image subjected to the shading correction, a geometric characteristic of an image to be formed on a second sheet by the image forming portion.

12 Claims, 17 Drawing Sheets

(56) References Cited

U.S. PATENT DOCUMENTS

2011/0249302 A1* 10/2011 Tanaka ................. H04N 1/2034
  358/461
2018/0359380 A1 12/2018 Itagaki ............... H04N 1/00588

* cited by examiner

FIG. 14

| SHEET TYPE | LENGTH OF SUB-SCANNING DIRECTION [mm] | LENGTH OF MAIN SCANNING DIRECTION [mm] | BASIS WEIGHT [g/m2] | SURFACE PROPERTY | COLOR | PRE-PRINTED SHEET | FIRST GEOMETRIC ADJUSTMENT VALUE (FOR FRONT SIDE) | SECOND GEOMETRIC ADJUSTMENT VALUE (FOR BACK SIDE) | READ GAP AMOUNT |
|---|---|---|---|---|---|---|---|---|---|
| ABC PAPER RECYCLING 1 | 210 | 297 | 75 | PLAIN PAPER | WHITE | NO | LEAD POS.: 0.3mm<br>SIDE POS.: -0.1mm<br>MAIN-SCAN MAG.: +0.02%<br>SUB-SCAN MAG.: +0.01% | LEAD POS.: 0.2mm<br>SIDE POS.: 0.1mm<br>MAIN-SCAN MAG.: +0.02%<br>SUB-SCAN MAG.: -0.03% | G(1) |
| ABC PAPER RECYCLING 2 | 297 | 420 | 75 | PLAIN PAPER | WHITE | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: 0.00% | G(1) |
| DEF PAPER EMBOSS A-1 | 216 | 279 | 150 | EMBOSS | WHITE | NO | LEAD POS.: 0.5mm<br>SIDE POS.: -0.5mm<br>MAIN-SCAN MAG.: +0.02%<br>SUB-SCAN MAG.: +0.02% | LEAD POS.: -0.3mm<br>SIDE POS.: 0.5mm<br>MAIN-SCAN MAG.: +0.01%<br>SUB-SCAN MAG.: -0.03% | G(3) |
| DEF PAPER COAT PAPER P-1 | 279 | 432 | 128 | BOTH SIDE COAT PAPER | WHITE | NO | LEAD POS.: 0.4mm<br>SIDE POS.: -0.2mm<br>MAIN-SCAN MAG.: +0.12%<br>SUB-SCAN MAG.: +0.06% | LEAD POS.: -0.2mm<br>SIDE POS.: 0.6mm<br>MAIN-SCAN MAG.: -0.02%<br>SUB-SCAN MAG.: -0.01% | G(2) |
| XYZ PAPER COLOR 81 | 210 | 297 | 75 | PLAIN PAPER | ORANGE | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: 0.00% | G(1) |
| XYZ PAPER COLOR 82 | 210 | 297 | 75 | PLAIN PAPER | PINK | NO | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: 0.00% | G(1) |
| FGH PAPER GRAPH PAPER 75 | 210 | 297 | 75 | PLAIN PAPER | WHITE | YES | LEAD POS.: 0.0mm<br>SIDE POS.: -0.0mm<br>MAIN-SCAN MAG.: +0.00%<br>SUB-SCAN MAG.: +0.00% | LEAD POS.: 0.0mm<br>SIDE POS.: -0.0mm<br>MAIN-SCAN MAG.: +0.00%<br>SUB-SCAN MAG.: 0.00% | G(1) |
| FGH PAPER PLAIN PAPER 2 | 210 | 297 | 75 | PLAIN PAPER | WHITE | NO | LEAD POS.: -0.03mm<br>SIDE POS.: -0.07mm<br>MAIN-SCAN MAG.: +0.06%<br>SUB-SCAN MAG.: -0.01% | LEAD POS.: -0.03mm<br>SIDE POS.: -0.10mm<br>MAIN-SCAN MAG.: +0.04%<br>SUB-SCAN MAG.: -0.02% | G(1) |

FIG. 15

SHEET LIBRARY EDITING

| SHEET TYPE | LENGTH OF SHEET IN SUB-SCAN DIR [mm] | LENGTH OF SHEET IN MAIN SCAN DIR [mm] | BASIS WEIGHT [g/m2] | SURFACE PROPERTY | COLOR |
|---|---|---|---|---|---|
| ABC PAPER RECYCLING 1 | 210 | 297 | 75 | PLAIN PAPER | WHITE |
| ABC PAPER RECYCLING 2 | 297 | 420 | 75 | PLAIN PAPER | WHITE |
| DEF PAPER EMBOSS A-1 | 216 | 279 | 150 | EMBOSS | WHITE |
| DEF PAPER COAT PAPER P-1 | 279 | 432 | 128 | BOTH SIDE COAT | WHITE |
| XYZ PAPER COLOR 81 | 210 | 297 | 75 | PLAIN PAPER | ORANGE |
| XYZ PAPER COLOR 82 | 210 | 297 | 75 | PLAIN PAPER | PINK |

[NEW ADDITION] [EDIT] [DELETE] [PRINT POSITION ADJUSTMENT]

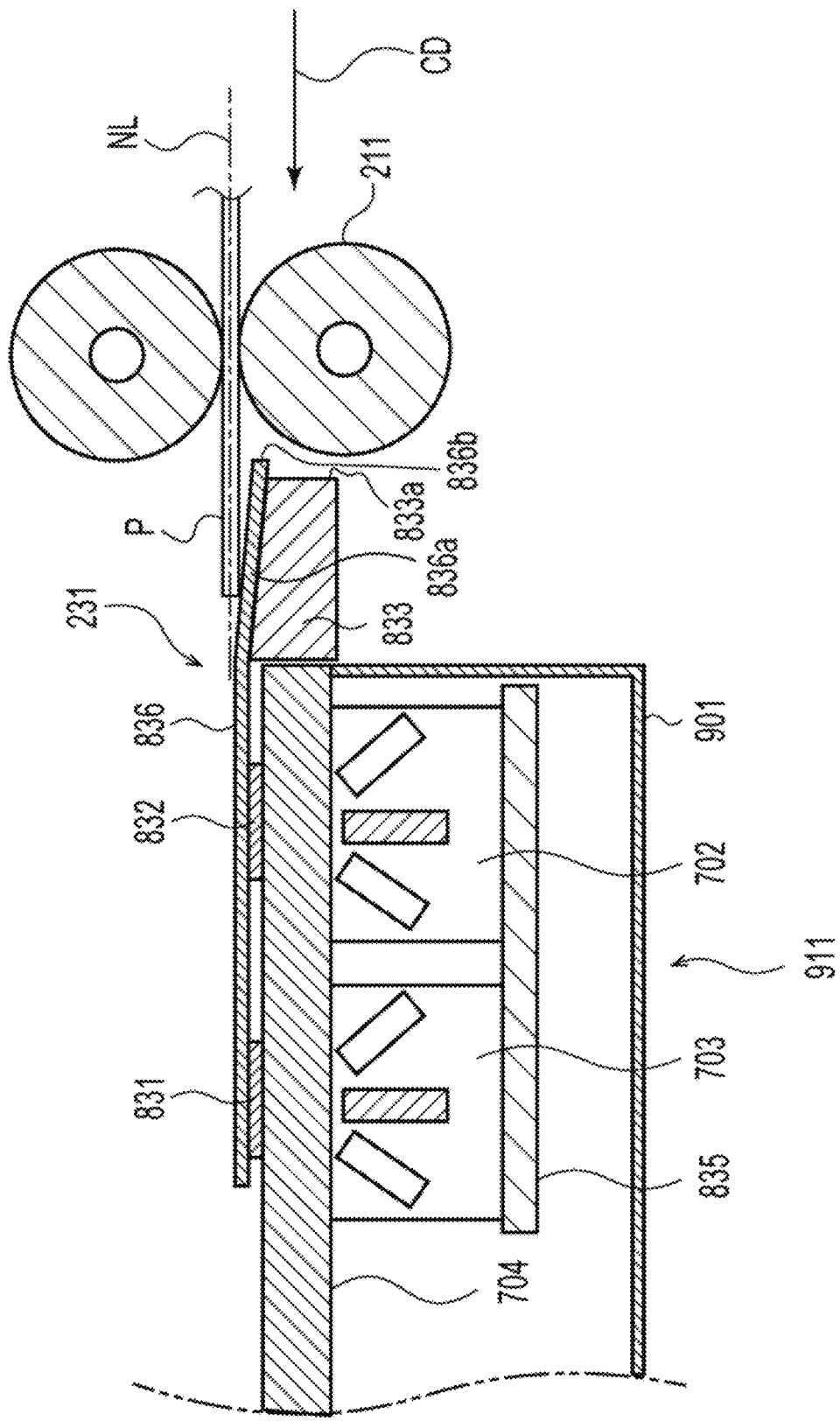

IMAGE FORMING SYSTEM

BACKGROUND OF THE INVENTION

Field of the Invention

The present invention relates to an image forming system configured to read an image of a sheet.

Description of the Related Art

Hitherto, an image reading apparatus configured to read an image of a sheet through a transparent member through use of an image sensor while conveying the sheet is known (see Japanese Patent Application Laid-Open No. 2006-109406). In addition, in general, shading correction is performed by reading a white reference plate through use of an image sensor in order to correct light amount unevenness of a light source of the image sensor in a main scanning direction and sensitivity unevenness of a light-receiving portion in the main scanning direction.

In order to perform the shading correction with high accuracy, a distance between the white reference plate and the image sensor exhibited when the image sensor reads the white reference plate is required to be set to a distance between the image sensor and a sheet, which is exhibited when the image sensor reads an image on the sheet being conveyed. In view of this, it is conceivable to provide a white reference plate on a side of a transparent member opposite to the image sensor, that is, on a conveyance path. When the white reference plate is provided on the conveyance path, the sheet may be rubbed by the white reference plate, and a part of the image formed on the sheet may be peeled off. Apart of the peeled image adheres to the white reference plate or is suspended to stain an image reading apparatus. The stain causes a streak image. This inhibits the image of the sheet from being read correctly, to thereby lower reading accuracy. In addition, when the white reference plate is provided on the conveyance path, there is a fear in that a leading end of the sheet may be brought into contact with the white reference plate, and buckling of the sheet may occur to cause a jam.

SUMMARY OF THE INVENTION

According to an embodiment of the present invention, there is provided an image forming system, comprising: an image forming portion configured to form an image on a first sheet; a conveyance unit configured to convey the first sheet on which the image has been formed by the image forming portion; a transparent member provided downstream of the conveyance unit in a conveyance direction in which the first sheet is conveyed; a reading unit including a reading sensor configured to read the image on the first sheet through the transparent member at a reading position in the conveyance direction; a reference member provided on the transparent member on a side opposite to the reading sensor with respect to the transparent member; a guide member configured to guide, to the reading position, the first sheet conveyed in the conveyance direction, the reference member being covered with the guide member; and a controller configured to perform shading correction on a result of reading the first sheet based on image data obtained by the reading unit reading the reference member through the transparent member, and to control, based on an image subjected to the shading correction, a geometric characteristic of the image to be formed on a second sheet by the image forming portion, wherein the image forming portion is configured to form an image on the second sheet based on the geometric characteristic controlled by the controller.

Further features of the present invention will become apparent from the following description of exemplary embodiments with reference to the attached drawings.

BRIEF DESCRIPTION OF THE DRAWINGS

FIG. 14 is a table for showing a sheet library.

FIG. 15 is a view for illustrating a sheet library editing screen displayed on an operation portion.

FIG. 18 is an enlarged view of a sheet guide member according to a modification example.

DESCRIPTION OF THE EMBODIMENTS (Image Forming System)

Figure 1:
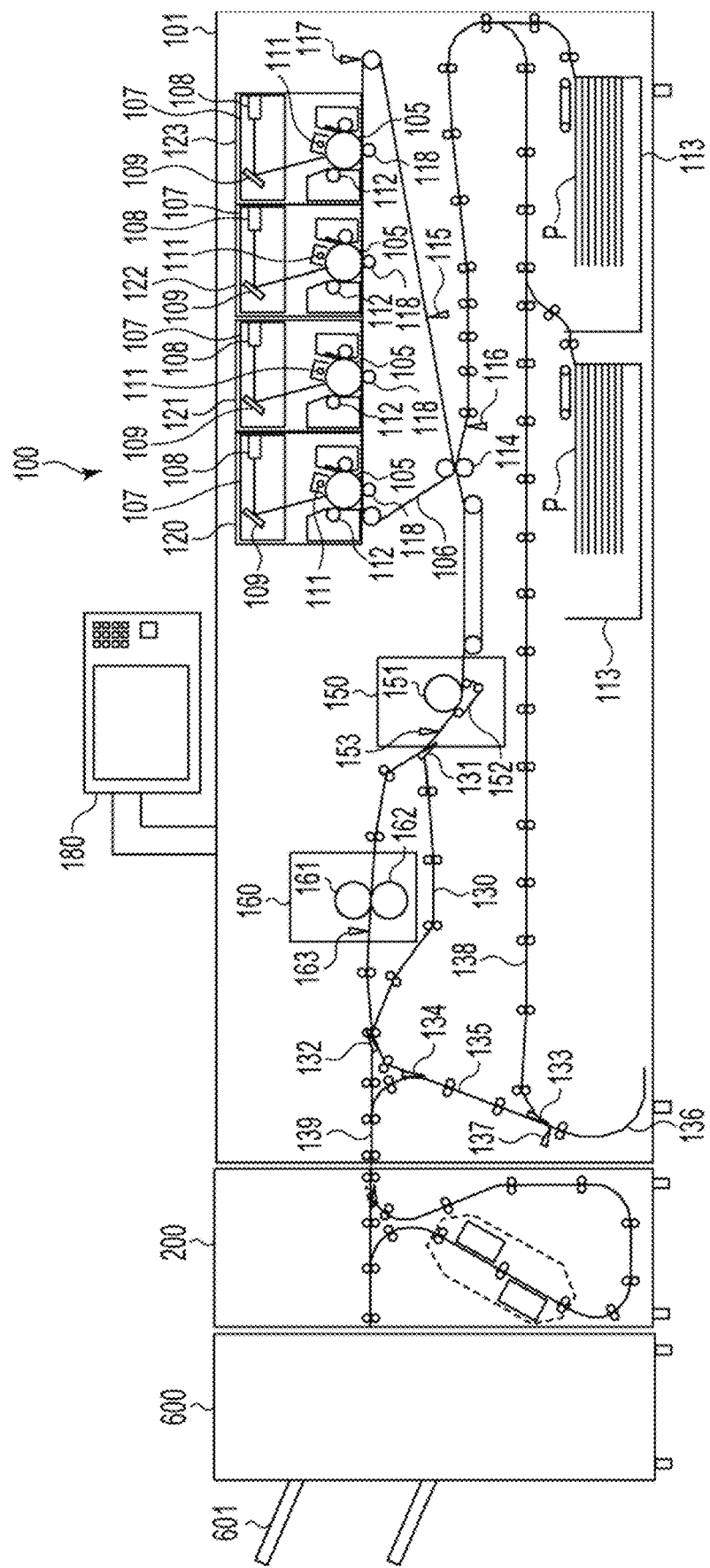
FIG. 1 is a partial cross-sectional view of an image forming system.

FIG. 1 is a partial cross-sectional view of an image forming system 100. The image forming system 100 includes an image forming apparatus (image forming portion) 101, an operation portion (user interface) 180, an adjustment unit (automatic adjustment apparatus) 200, and a post-processing apparatus (finisher) 600. The image forming apparatus 101 is configured to form an image on a recording medium (hereinafter referred to as "sheet") P. The operation portion 180 is operated by a user in order to set a condition for image formation to be performed by the image forming apparatus 101, and is configured to display a state of the image forming apparatus 101. The adjustment unit 200 is configured to perform front/back registration for measuring position misregistration between an image formed on a front side of the sheet P by the image forming apparatus 101 and an image formed on a back side of the sheet P by the image forming apparatus 101. The post-processing apparatus 600 is configured to discharge the sheet P having the image formed thereon to a discharge tray 601, and to perform post-processing including staple processing, punching processing, and sorting processing.

(Image Forming Apparatus)

The image forming apparatus 101 is an electrophotographic laser beam printer. The image forming apparatus 101 uses an electrophotographic image forming process to form an image on a sheet. Examples of the image forming apparatus 101 include not only a laser beam printer but also an electrophotographic copying machine (for example, digital copying machine), a color LED printer, a multifunction peripheral (MFP), a facsimile apparatus, and a printing machine. The image forming apparatus 101 is not limited to a color image forming apparatus configured to form a color image, and may be a monochrome image forming apparatus configured to form a monochrome image. The image forming apparatus 101 is not limited to an electrophotographic image forming apparatus, and may be an ink-jet printer, a sublimation type printer, or a heat-drying type thermal printer.

Figure 2:
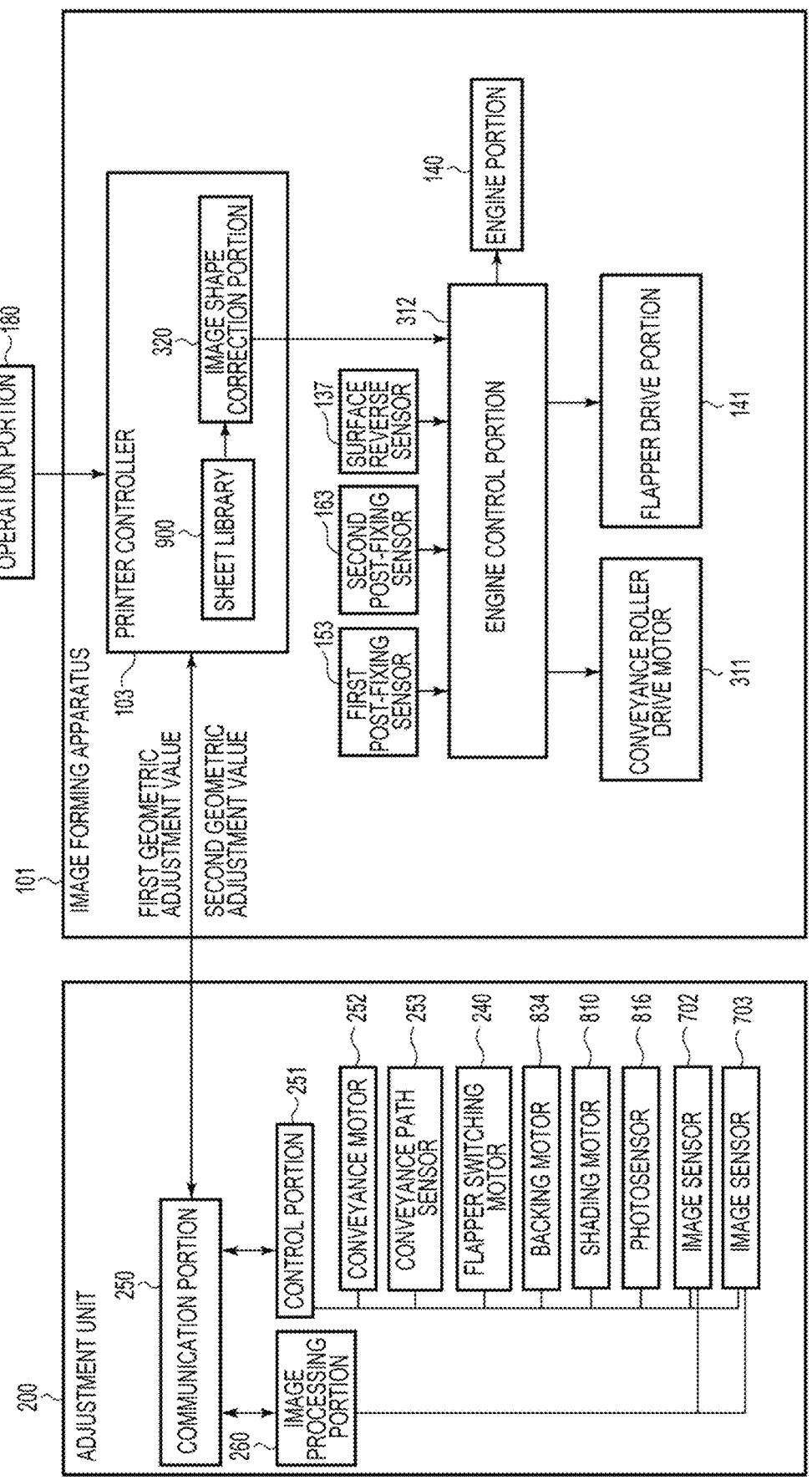
FIG. 2 is a block diagram of an image forming apparatus and an adjustment unit.

The image forming apparatus 101 is described with reference to FIG. 1 and FIG. 2. FIG. 2 is a block diagram of the image forming apparatus 101 and the adjustment unit 200. The image forming apparatus 101 includes a printer controller 103, an engine control portion 312, and an engine portion 140. The printer controller 103 includes a sheet library 900 and an image shape correction portion 320. The printer controller 103 is electrically connected to the operation portion 180, the engine control portion 312, and a communication portion 250 of the adjustment unit 200.

The engine control portion 312 is electrically connected to a conveyance roller drive motor 311 and a flapper drive portion 141. The flapper drive portion 141 is configured to drive flappers 131, 132, 133, and 134. The engine control portion 312 is further electrically connected to a first post-fixing sensor 153, a second post-fixing sensor 163, a surface reverse sensor 137, and the engine portion 140. The engine control portion 312 is configured to control the engine portion 140 to execute the image forming process (including sheet feeding processing). The engine portion 140 includes a yellow image forming portion 120, a magenta image forming portion 121, a cyan image forming portion 122, and a black image forming portion 123. The engine portion 140 further includes a feed cassette 113, an intermediate transfer member 106, a secondary transfer roller 114, a first fixing device 150, and a second fixing device 160.

The yellow image forming portion 120 is configured to form a yellow (Y) toner image. The magenta image forming portion 121 is configured to form a magenta (M) toner image. The cyan image forming portion 122 is configured to form a cyan (C) toner image. The black image forming portion 123 is configured to form a black (K) toner image. The yellow image forming portion 120, the magenta image forming portion 121, the cyan image forming portion 122, and the black image forming portion 123 have substantially the same structure except for their toner colors, and hence the following description is directed to the yellow image forming portion 120.

The yellow image forming portion 120 includes a photosensitive drum 105 configured to rotate. A charging device 111, a laser scanner 107, a developing device 112, and a primary transfer roller 118 are arranged around the photosensitive drum 105. The charging device 111 is configured to uniformly charge a surface of the photosensitive drum 105. The laser scanner 107 includes a laser driver (not shown) configured to turn on and off laser light emitted from a semiconductor laser 108 based on image data supplied from the printer controller 103. The laser light emitted from the semiconductor laser 108 is deflected in a main scanning direction by a rotary polygon mirror (not shown). The laser light deflected in the main scanning direction is guided to the surface of the photosensitive drum 105 by a reflecting mirror 109 to expose the uniformly charged surface of the photosensitive drum 105 in the main scanning direction. Thus, an electrostatic latent image is formed on the surface of the photosensitive drum 105 based on the image data.

The developing device 112 is configured to develop the electrostatic latent image on the surface of the photosensitive drum 105 with the yellow (Y) toner to form the yellow (Y) toner image. A voltage having a polarity reverse to that of the toner image is applied to the primary transfer roller 118 to transfer the yellow (Y) toner image on the surface of the photosensitive drum 105 onto the intermediate transfer member 106. In the same manner, the magenta (M) toner image, the cyan (C) toner image, and the black (K) toner image that are formed by the magenta image forming portion 121, the cyan image forming portion 122, and the black image forming portion 123, respectively, are sequentially transferred onto the intermediate transfer member 106. The yellow (Y) toner image, the magenta (M) toner image, the cyan (C) toner image, and the black (K) toner image are transferred onto the intermediate transfer member 106 so as to be superimposed on each other, to thereby form a full-color toner image.

Meanwhile, the sheets P stored in the feed cassette 113 are conveyed to the secondary transfer roller 114 one by one. The secondary transfer roller 114 brings the sheet P into press contact against the intermediate transfer member 106, and at the same time, a bias having a polarity reverse to that of the toner is applied to the secondary transfer roller 114. The secondary transfer roller 114 transfers the toner image on the intermediate transfer member 106 to the sheet P. The photosensitive drum 105 and the developing device 112 are attachable and removable. A feed timing sensor 116 for adjusting a timing to feed the sheet P is arranged on a conveyance path for the sheet before the secondary transfer roller 114. An image formation start position detection sensor 115 for determining a print start position when the image formation is to be performed and a density sensor 117 for measuring the density of a patch image during density control are arranged around the intermediate transfer member 106. When the density control is to be performed, the density of each patch image is measured by the density sensor 117.

The image forming apparatus 101 includes the first fixing device 150 and the second fixing device 160 each configured to heat and pressurize the toner image transferred to the sheet P to fix the toner image to the sheet P. The first fixing device 150 includes a fixing roller 151 including an internal heater, a pressure belt 152 configured to bring the sheet P into press contact against the fixing roller 151, and the first post-fixing sensor 153 configured to detect the completion of the fixing. The fixing roller 151 and the pressure belt 152 fix the toner image to the sheet P by heating and pressurizing the sheet P while nipping the sheet P, and simultaneously convey the sheet P. The second fixing device 160 is arranged on downstream of the first fixing device 150 in a conveyance direction of the sheet P. The second fixing device 160 is provided to increase the gloss of the image fixed to the sheet P by the first fixing device 150 and to ensure the fixability. The second fixing device 160 includes a fixing roller 161, a pressure roller 162, and the second post-fixing sensor 163.

The second fixing device 160 is not required to be used depending on the type of the sheet P. In this case, for the purpose of reducing an energy consumption amount, the sheet P is conveyed to a conveyance path 130 without passing through the second fixing device 160. The flapper 131 switches a conveyance destination of the sheet P between the second fixing device 160 and the conveyance path 130. The flapper 132 switches the conveyance destination of the sheet P between a conveyance path 135 and a discharge path 139. For example, in a face-up discharge mode, the flapper 132 switches the conveyance destination of the sheet P to the discharge path 139 in order to convey the sheet P having an image formed on its first surface to the discharge path 139. For example, in a face-down discharge mode, the flapper 132 switches the conveyance destination of the sheet P to the conveyance path 135 in order to convey the sheet P having the image formed on the first surface to the conveyance path 135. When a trailing end of the sheet P passes through the flapper 134, the conveyance direction of the sheet P is reversed, and the conveyance destination of the sheet P is switched to the discharge path 139 by the flapper 134.

For example, in a double-sided printing mode, in order to print a chart for adjustment on a second surface of the sheet P after a chart for adjustment (test pattern for measurement) has been printed on the first surface of the sheet P, the flapper 132 switches the conveyance destination of the sheet P to the conveyance path 135. The sheet P conveyed to the conveyance path 135 is conveyed to a reversing portion 136. The sheet P conveyed to the reversing portion 136 has the trailing end of the sheet P detected by the surface reverse sensor 137, and then has the conveyance direction of the sheet P reversed. The flapper 133 switches the conveyance destination of the sheet P to a conveyance path 138. Thus, the front side and the back side of the sheet P are reversed. The sheet P is conveyed from the conveyance path 138 to a secondary transfer nip formed between the intermediate transfer member 106 and the secondary transfer roller 114. The chart for adjustment is transferred to the second surface of the sheet at the secondary transfer nip. The sheet P having the charts for adjustment printed on both sides is conveyed from the discharge path 139 to the adjustment unit 200.

(Adjustment Unit)

Figure 3:
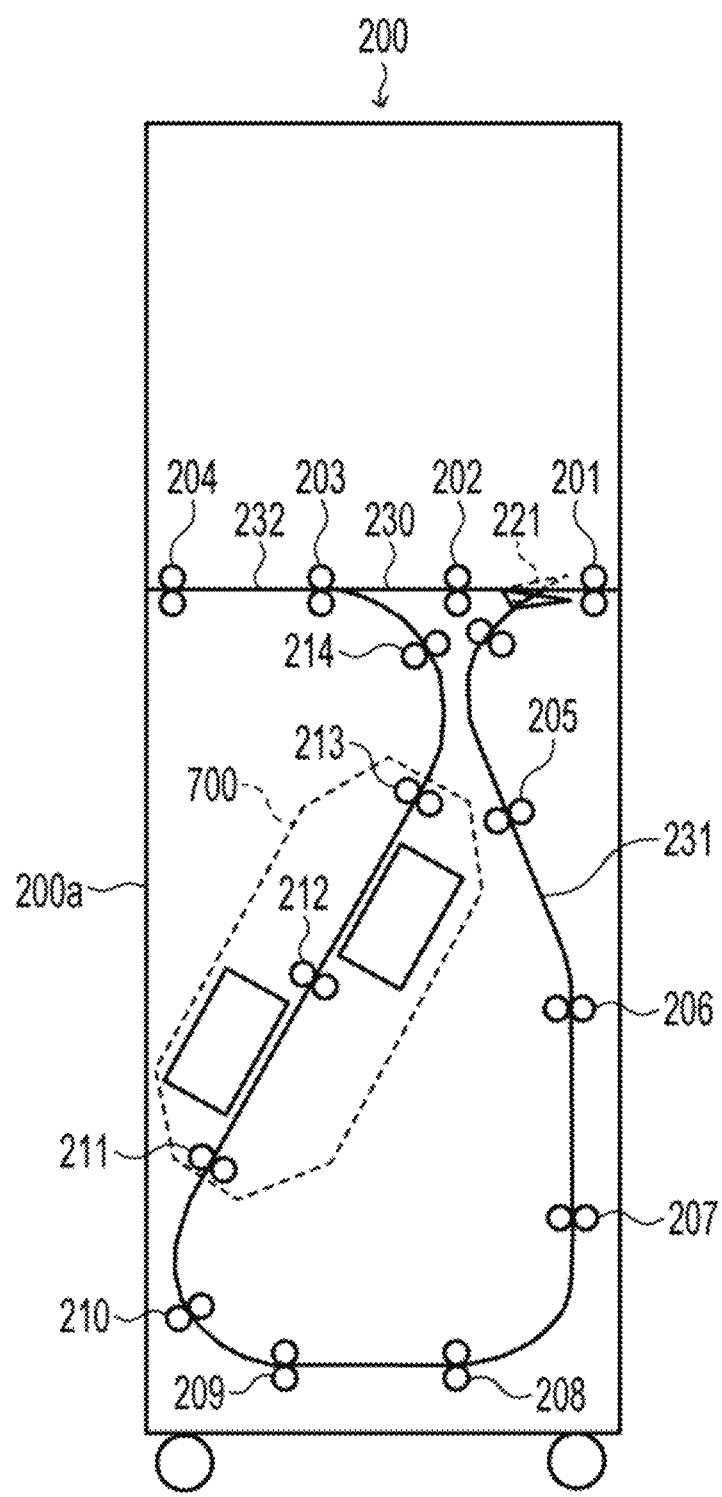
FIG. 3 is a cross-sectional view of the adjustment unit.

The adjustment unit 200 is arranged on downstream of the image forming apparatus 101 in the conveyance direction of the sheet P. FIG. 3 is a cross-sectional view of the adjustment unit 200. The adjustment unit 200 includes a through pass 230, a measurement path (conveyance path) 231 diverted downward, and a discharge path 232 for discharging the sheet from the through pass 230 or the measurement path 231 to the post-processing apparatus 600 arranged on downstream of the adjustment unit 200. The measurement path 231 is provided with a front/back registration portion (image reading apparatus) 700 serving as a measurement portion configured to perform front/back registration for reading the charts for adjustment formed on both sides of the sheet P. The adjustment unit 200 includes a flapper 221 configured to switch the conveyance destination of the sheet P between the through pass 230 and the measurement path 231.

When the front/back registration is not to be performed by the front/back registration portion 700, the flapper 221 waits in a downward state for switching the conveyance destination of the sheet P to the through pass 230. The adjustment unit 200 receives the sheet P from the image forming apparatus 101, and conveys the sheet P to the through pass 230 by first conveyance rollers 201. The sheet P is conveyed from the through pass 230 to the discharge path 232 by second conveyance rollers 202 and third conveyance rollers 203. The sheet P is discharged to the post-processing apparatus 600 by fourth conveyance rollers 204.

Meanwhile, when the front/back registration is to be performed by the front/back registration portion 700, the flapper 221 waits in an upward state for switching the conveyance destination of the sheet P to the measurement path 231. The adjustment unit 200 receives the sheet P from the image forming apparatus 101, and conveys the sheet P to the measurement path 231 by the first conveyance rollers 201. The sheet P is conveyed to the front/back registration portion 700 by conveyance roller pairs 205, 206, 207, 208, 209, and 210. The front/back registration portion 700 reads the charts for adjustment formed on both sides of the sheet P while conveying the sheet P by conveyance roller pairs 211, 212, and 213. The sheet P is conveyed to the discharge path 232 by the conveyance roller pair 214, and is discharged to the post-processing apparatus 600 by the fourth conveyance rollers 204.

As illustrated in FIG. 2, the adjustment unit 200 includes the communication portion 250, an image processing portion 260, and a control portion (controller) 251. The communication portion 250 is electrically connected to the image processing portion 260 and the control portion 251. The communication portion 250 is electrically connected to the printer controller 103 of the image forming apparatus 101. The adjustment unit 200 further includes a conveyance motor 252, a conveyance path sensor 253, a flapper switching motor 240, a backing motor 834, a shading motor 810, a photosensor 816, an image sensor 702, and an image sensor 703. The conveyance motor 252, the conveyance path sensor 253, the flapper switching motor 240, the backing motor 834, the shading motor 810, the photosensor 816, the image sensor 702, and the image sensor 703 are electrically connected to the control portion 251. The image processing portion 260 is electrically connected to the image sensor 702 and the image sensor 703. The engine control portion (controller) 312 controls a geometric characteristic of the image formed on the recording medium by the image forming apparatus 101 based on images read by the image sensor 702 and the image sensor 703.

(Front/Back Registration Portion)

Figure 4:
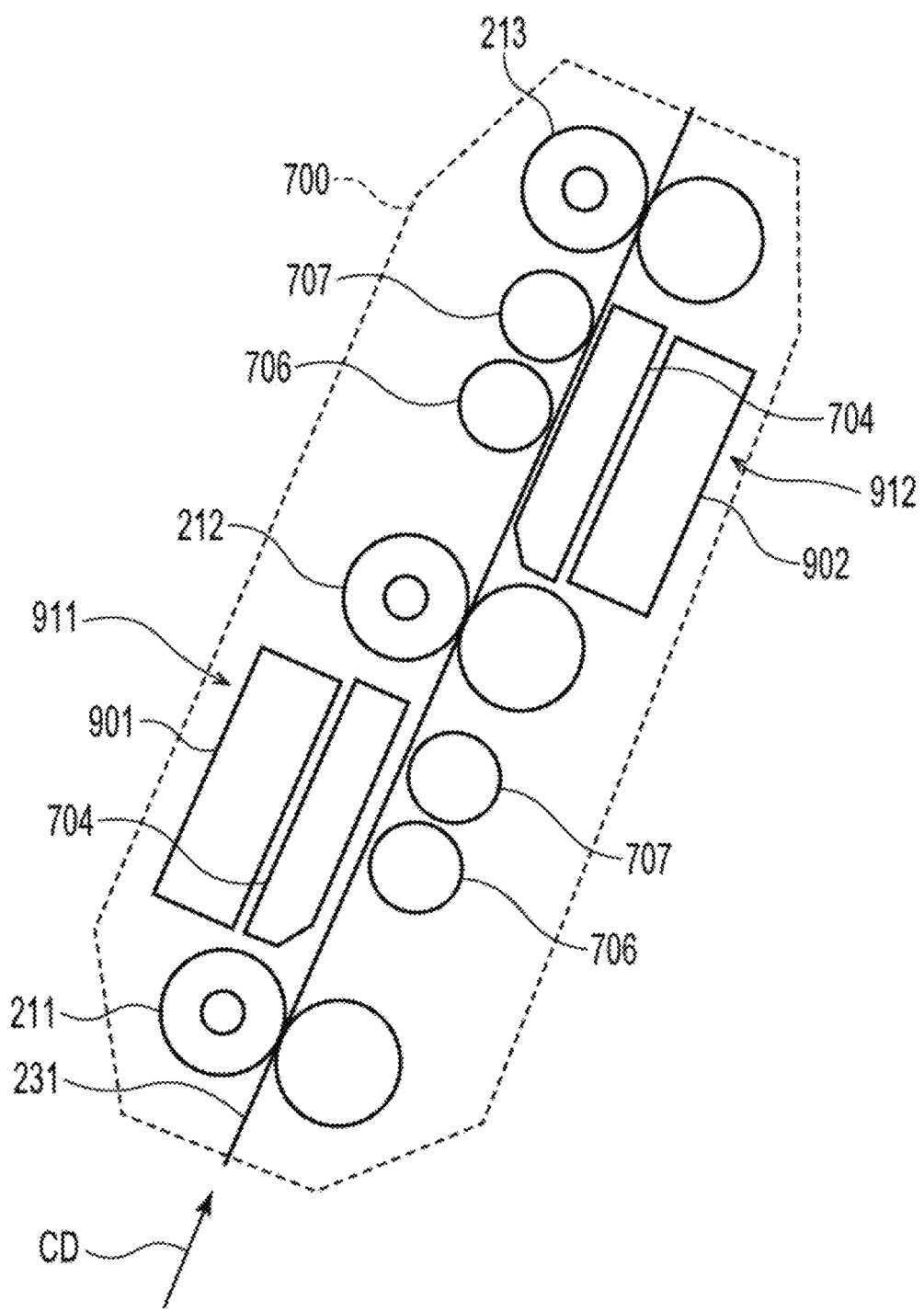
FIG. 4 is a view for illustrating a front/back registration portion 700.

A structure of the front/back registration portion 700 is described with reference to FIG. 4. FIG. 4 is a view for illustrating the front/back registration portion 700. The front/back registration portion 700 is configured to measure a shape of the sheet P, shapes of image patterns formed on the sheet P, and a positional relationship between the image patterns. In order to obtain a highly accurate measurement result, it is required to average shape variations and print position variations for each sheet P, and hence a plurality of sheets P are measured. In order to shorten an adjustment time for measuring the plurality of sheets P, the front/back registration portion 700 performs the measurement while conveying the sheets P. In addition, a size of the front/back registration portion 700 is preferred to be small, and hence the front/back registration portion 700 uses the image sensors (reading sensors) 702 and 703 that are contact image sensors (CISs).

The front/back registration portion 700 includes a front-side reading portion (reading unit) 911 configured to read the front side of the sheet P and a back-side reading portion (reading unit) 912 configured to read the back side of the sheet P. The front-side reading portion 911 includes a reading box 901 for the front side, a reading glass (glass plate) 704 serving as a transparent member (light transmitting member), and backing rollers 706 and 707. The back-side reading portion 912 includes a reading box 902 for the back side, the reading glass 704, and the backing rollers 706 and 707. The reading glass 704 forms a part of the measurement path 231. The reading box 901 for the front side is arranged on one side of the measurement path 231. The reading box 902 for the back side is arranged on another side of the measurement path 231. The reading box 901 for the front side and the reading box 902 for the back side continuously read the front side and the back side of the sheet P being conveyed in the conveyance direction CD. Each of the reading box 901 for the front side and the reading box 902 for the back side is provided with a plurality of image sensors (hereinafter referred to as "CISs") 702 and 703 as reading units. Each of the reading box 901 for the front side and the reading box 902 for the back side is arranged so as to be opposed to the measurement path 231 with respect to the reading glass 704. The backing rollers 706 and 707 are arranged on the opposite side of the measurement path 231 so as to be opposed to the reading glass 704.

The conveyance roller pairs (conveyance units) 211, 212, and 213 are configured to convey the sheet P in the conveyance direction CD at a stable conveyance speed. The conveyance roller pairs 211, 212, and 213 are driven by the conveyance motor (drive unit) 252. The reading glass 704 functions as a guide member configured to guide movement of the sheet P in order to stabilize the position of the sheet P in a depth-of-focus direction of the CISs 702 and 703 of the reading box 901 for the front side and the CISs 702 and 703 of the reading box 902 for the back side. The backing rollers 706 and 707 each have a black surface in order to clarify a contrast with an end portion of the sheet P. The backing rollers 706 and 707 are driven by the backing motor 834.

(Reading Portion)

Figure 5:
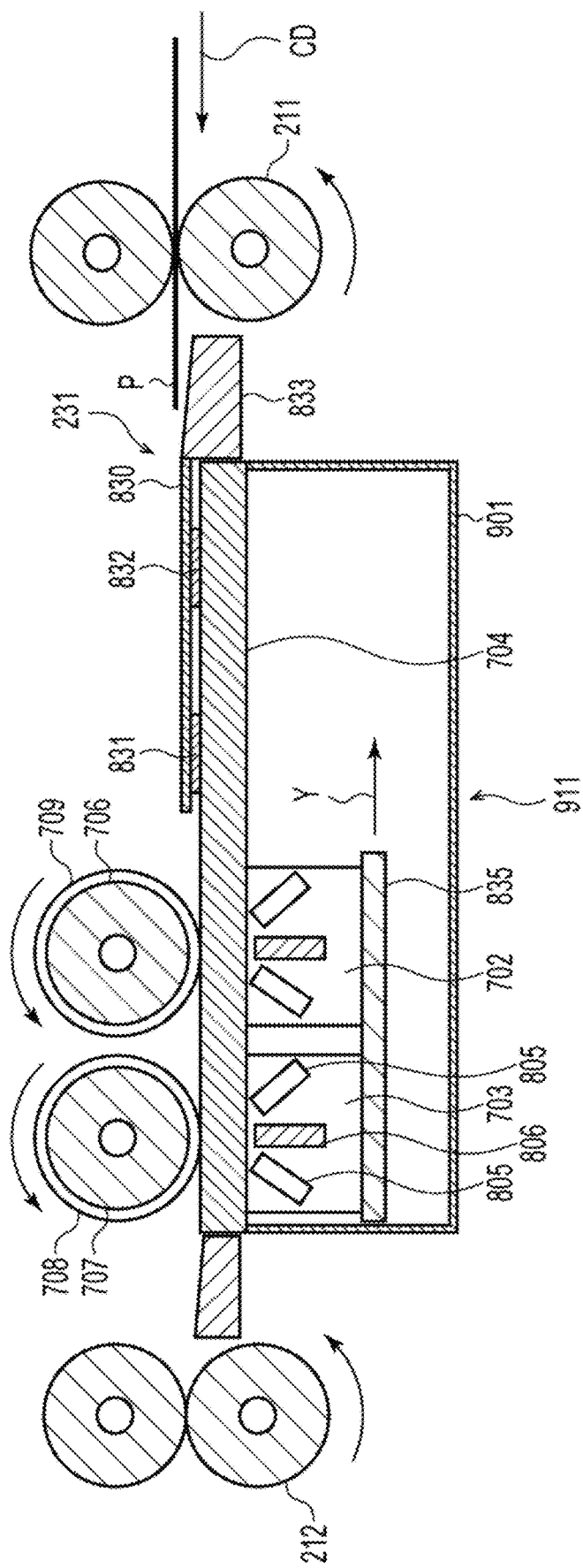
FIG. 5 is a cross-sectional view of a front-side reading portion.
Figure 6:
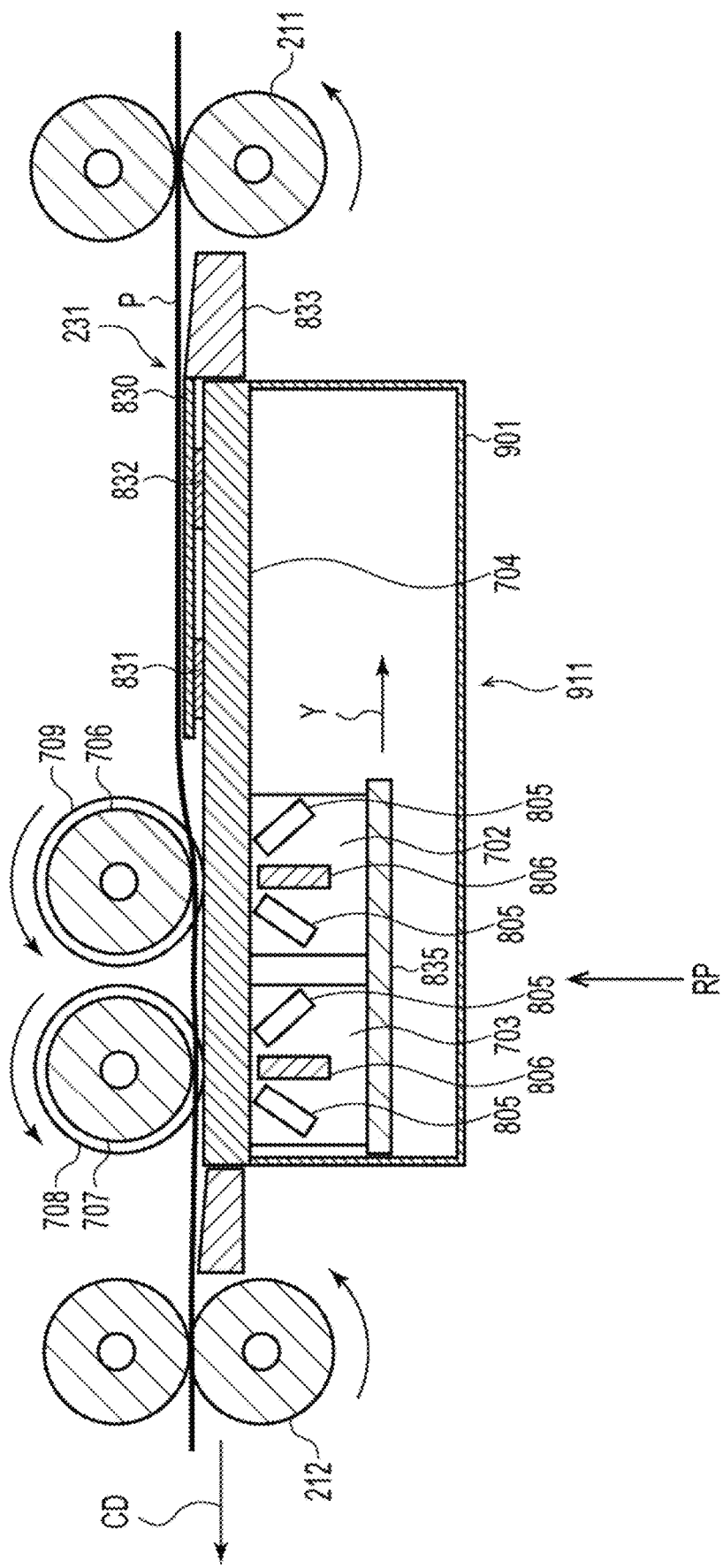
FIG. 6 is a cross-sectional view of the front-side reading portion.

The front-side reading portion 911 has the same configuration as that of the back-side reading portion 912, and hence the front-side reading portion 911 is described below by omitting description of the back-side reading portion 912. FIG. 5 and FIG. 6 are cross-sectional views of the front-side reading portion 911. A state in which the sheet P is conveyed to the front-side reading portion 911 is described with reference to FIG. 5 and FIG. 6. The CIS 702 is arranged so as to be opposed to the backing roller 706 with respect to the reading glass 704. The CIS 703 is arranged so as to be opposed to the backing roller 707 with respect to the reading glass 704. The CISs 702 and 703 are carried by a carriage (carrying member) 835. The CISs 702 and 703 can be moved by the carriage 835 in a sub-scanning direction Y along the conveyance direction CD.

The sheet P is conveyed to an upper surface of the transparent reading glass 704 by the conveyance roller pair 211 in the conveyance direction CD. A plurality of white reference plates (plurality of reference members) 831 and 832 are arranged on a surface (first surface) of the reading glass 704 on the measurement path (conveyance path) 231 side. The white reference plates 831 and 832 are provided on the opposite side of the reading glass 704 from the CISs 702 and 703. A sheet guide member 830 is arranged on the white reference plates 831 and 832. The sheet P is conveyed on the sheet guide member 830, passes through a reading position between the CIS 702 and the backing roller 706 and a reading position between the CIS 703 and the backing roller 707, and is conveyed by the conveyance roller pair 212 on the downstream side as illustrated in FIG. 6.

The CISs 702 and 703 irradiate the sheet P with light from light-emitting portions 805 each having a light source, and collect reflected light from the sheet P on a line-shaped light-receiving portion (light-receiving sensor surface) 806 by, for example, a rod lens array. The reflected light received by each of the CISs 702 and 703 is photoelectrically converted and output to the image processing portion 260 as an output signal. The image processing portion 260 generates image data based on the output signals from CISs 702 and 703. The CISs 702 and 703 located at a reading position RP read the image of the sheet P being conveyed on the reading glass 704 at a constant speed by a sheet flow reading method. The image processing portion 260 generates a front-side measurement pattern image 822 of the sheet P, which is described later, based on the output signals from CISs 702 and 703.

The backing rollers 706 and 707 are driven by the backing motor 834 so as to rotate in the direction indicated by the arrows in FIG. 5 and FIG. 6 at a circumferential speed substantially equal to the conveyance speed (reading speed) of the sheet P. The backing rollers 706 and 707 have a gap set between the backing rollers 706 and 707 and the reading glass 704 so as to reduce the unexpected movement (wobbling) of the sheet P being conveyed to the reading position RP of the CISs 702 and 703. Abutment rollers (gap securing members) 708 and 709 for securing a gap between the backing rollers 706 and 707 and the reading glass 704 by being brought into abutment with the reading glass 704 are arranged at both end portions of the backing rollers 706 and 707 in their axial direction, respectively. The gap between the backing rollers 706 and 707 and the reading glass 704 is obtained by adding a margin (margin gap) to a thickness of the sheet P to be conveyed. The gap is set so that the surface (surface to be read) of the sheet P falls within a readable range of each of the CISs 702 and 703 even when the sheet P unexpectedly moves.

(Shading Correction)

Figure 7:
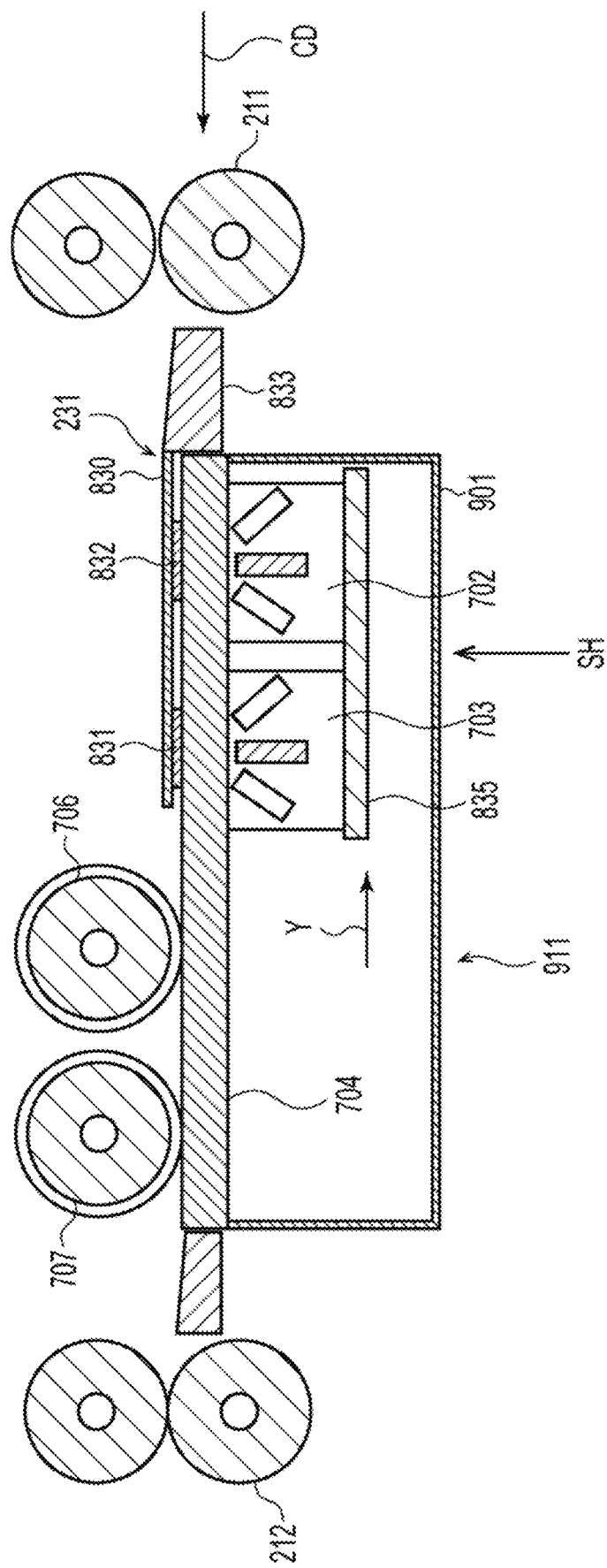
FIG. 7 is a cross-sectional view of the front-side reading portion with a contact image sensor (CIS) having been moved to a shading correction position.
Figure 8:
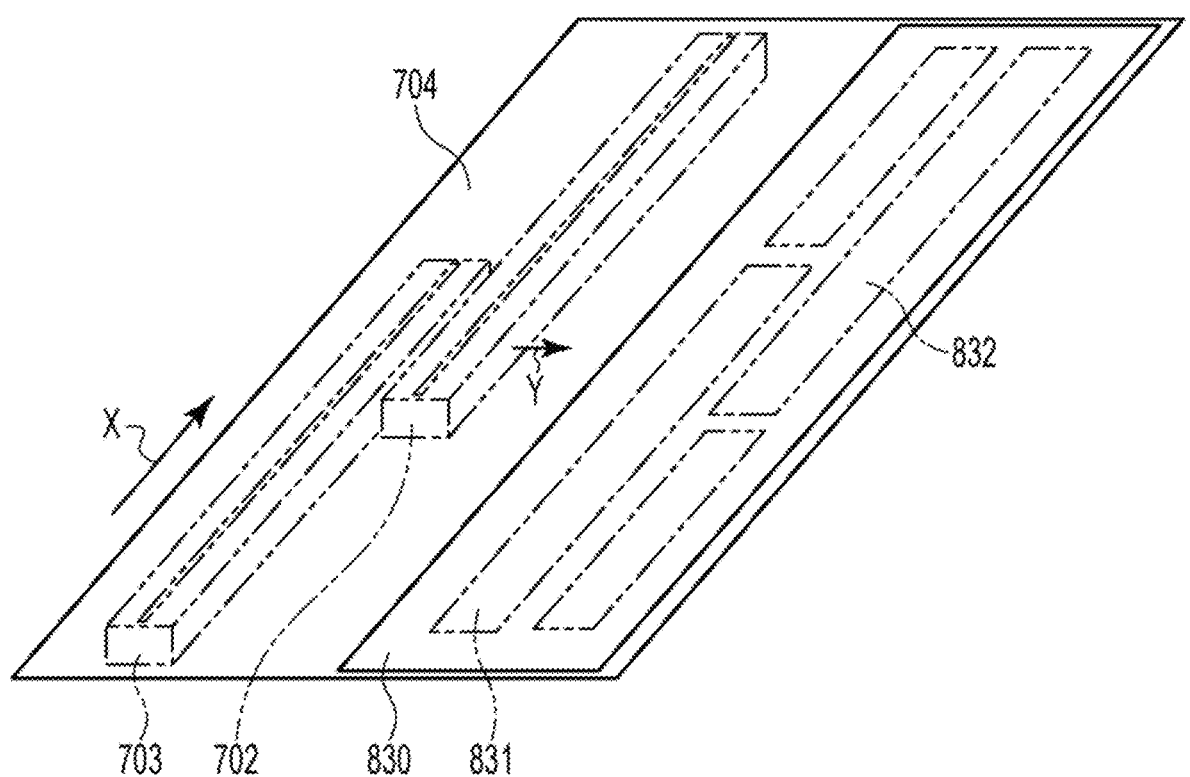
FIG. 8 is a perspective view of the CIS viewed from a reading glass side.

Shading correction is described with reference to FIG. 7 and FIG. 8. FIG. 7 is a cross-sectional view of the front-side reading portion 911 with the CISs 702 and 703 having been moved to a shading correction position SH. FIG. 8 is a perspective view of the CISs 702 and 703 viewed from the reading glass 704 side. In order to execute the shading correction, the CISs 702 and 703 are moved by the carriage 835 in the sub-scanning direction Y from the reading position RP of FIG. 6 on the downstream side to the shading correction position SH of FIG. 7 on the upstream side in the conveyance direction CD of the sheet P.

The CISs 702 and 703 cannot perform uniform image reading due to light amount unevenness of the light-emitting portions 805 and sensitivity unevenness of the light-receiving portion 806. In view of this, the shading correction is executed in order to enable uniform image reading. In the shading correction, the CISs 702 and 703 read the white reference plates 831 and 832 through the reading glass 704. The color of the surfaces of the white reference plates 831 and 832 to be read has the tint managed entirely. The CISs 702 and 703 output, as reading results, output signals (image data) to the image processing portion 260. The image processing portion (correction unit) 260 generates a correction value for correcting the image data when the sheet P is read, based on the output signals from the CISs 702 and 703 to be obtained when the white reference plates 831 and 832 are read. The control portion 251 corrects, based on the correction value, an amount of light emitted from each light-emitting portion 805 irradiating the sheet P, and corrects, based on the correction value, an amplification factor (gain) for amplifying the output signal from each light-receiving portion 806 to be obtained when the sheet P is read. In this manner, the CISs 702 and 703 can uniformly read the sheet P by adjusting the amount of light emitted from the light-emitting portions 805 and/or the amplification factor (gain) of the light-receiving portion 806 based on results of reading the white reference plates 831 and 832.

In this embodiment, the shading correction position SH of FIG. 7 is arranged on the upstream side of the reading position RP of FIG. 6 in the conveyance direction CD of the sheet P. Therefore, the white reference plates 831 and 832 are arranged on the upstream side of the reading position RP in the conveyance direction CD of the sheet P. When the white reference plates 831 and 832 are at the same height as the sheet P being conveyed on the measurement path 231 in the depth-of-focus direction of the CISs 702 and 703 as much as possible, accuracy of the shading correction is improved. In view of this, in this embodiment, the white reference plates 831 and 832 are arranged on the surface (upper surface) of the reading glass 704 on the measurement path 231 side.

It is assumed that the white reference plates 831 and 832 are arranged on the upper surface of the reading glass 704 on the downstream side of the reading position RP of FIG. 6 in the conveyance direction CD of the sheet P. In that case, the leading end of the sheet P that has passed through the reading position RP while being regulated by the backing rollers 706 and 707 in the depth-of-focus direction may get caught by the white reference plates 831 and 832 to cause a jam. When the white reference plates 831 and 832 are arranged on the lower surface (back side) of the reading glass 704 in order to prevent an occurrence of a jam, the accuracy of shading correction deteriorates. In view of this, in this embodiment, as described above, the white reference plates 831 and 832 are arranged on the surface (upper surface) of the reading glass 704 on the measurement path 231 side on the upstream side of the reading position RP of FIG. 6 in the conveyance direction CD of the sheet P.

The white reference plates 831 and 832 may be formed on the surface (upper surface) of the reading glass 704 on the measurement path 231 side through printing or painting. In another case, the white reference plates 831 and 832 may be affixed to the surface (upper surface) of the reading glass 704 on the measurement path 231 side with an adhesive or a double-coated tape. The white reference plates 831 and 832 are provided so that white reference surfaces having the tint managed entirely are on the surface side of the reading glass 704. The white reference plates 831 and 832 are expensive, and are handled so as not to be scratched or dusted.

As illustrated in FIG. 8, the CIS 702 and the CIS 703 are arranged so as to be offset in a main scanning direction X (width direction) and the sub-scanning direction Y (conveyance direction CD) (staggered arrangement). The two CISs 702 and 703 are arranged so as to partially overlap each other in the main scanning direction X, to thereby be able to read a reading area wider than a reading area that can be read by one CIS 702. In this embodiment, the two CISs 702 and 703 are arranged so as to partially overlap each other in the main scanning direction X, to thereby be able to read a reading area wider than the width of the sheet P in the main scanning direction X. The CISs 702 and 703 read black areas of the backing rollers 706 and 707 being backgrounds together with the image of the sheet P, to thereby be able to detect an end portion of the sheet P in the main scanning direction with an increased contrast between the end portion of the sheet P and the black area of the sheet P. This improves accuracy of the front/back registration.

In the same manner as the CISs 702 and 703, the white reference plates 831 and 832 are also arranged so as to be offset in the main scanning direction X and the sub-scanning direction Y (staggered arrangement) as illustrated in FIG. 8. This can reduce the areas of the white reference plates 831 and 832, and can lower the cost. In addition, the sheet guide member (guide sheet) 830 is arranged so as to cover the white reference plates 831 and 832. The sheet guide member 830 is bonded to the white reference plates 831 and 832 so as to cover the entire surfaces of the white reference plates 831 and 832 in order to prevent the leading end of the sheet P being conveyed from getting caught in the white reference plates 831 and 832. As a result, it is possible to suppress the occurrence of a jam. The white reference plates 831 and 832 arranged in a staggered manner are arranged on the upper surface of the reading glass 704 on the upstream side in the conveyance direction CD and covered with the sheet guide member 830, to thereby be able to prevent the leading end of the sheet P from being brought into contact with the white reference plates 831 and 832. That is, it is possible to suppress the occurrence of a jam ascribable to the white reference plates 831 and 832 provided on the measurement path (conveyance path) 231. In addition, the white reference plates 831 and 832 are prevented from being stained, and deterioration in reading accuracy is suppressed.

The sheet guide member 830 may be affixed to the reading glass 704 so as to be smoothly connected to a conveyance guide member 833 forming a part of the measurement path 231 between the conveying roller pair 211 arranged on upstream of the reading glass 704 and the reading glass 704. In addition, an upstream edge portion of the sheet guide member 830 in the conveyance direction CD may be provided on an upper surface of the conveyance guide member 833. FIG. 18 is an enlarged view of a sheet guide member 836 according to a modification example. The sheet guide member 836 is provided so as to cover the white reference plates 831 and 832 provided on the surface of the reading glass 704 on the measurement path 231 side. This can prevent the leading end of the sheet P from being brought into contact with the white reference plates 831 and 832, and can suppress the occurrence of a jam. In addition, an upstream edge portion 836*a* of the sheet guide member 836 in the conveyance direction CD is provided so as to cover the upper surface of the conveyance guide member 833. The upstream edge portion 836*a* of the sheet guide member 836 may be provided below a nip line (common tangent of two rollers) NL of the conveyance roller pair 211. Thus, a leading edge of the sheet P is appropriately guided to the measurement path 231 by the upper surface of the upstream edge portion 836*a* of the sheet guide member 836. An upstream edge 836*b* of the upstream edge portion 836*a* of the sheet guide member 836 may also be located on upstream of an upstream edge 833*a* of the conveyance guide member 833 in the conveyance direction CD. This can prevent the sheet P from being brought into contact with the upstream edge 836*b* of the upstream edge portion 836*a* of the sheet guide member 836 or the upstream edge 833*a* of the conveyance guide member 833, and can suppress the occurrence of a jam.

(Shading Drive Portion)

Figure 9:
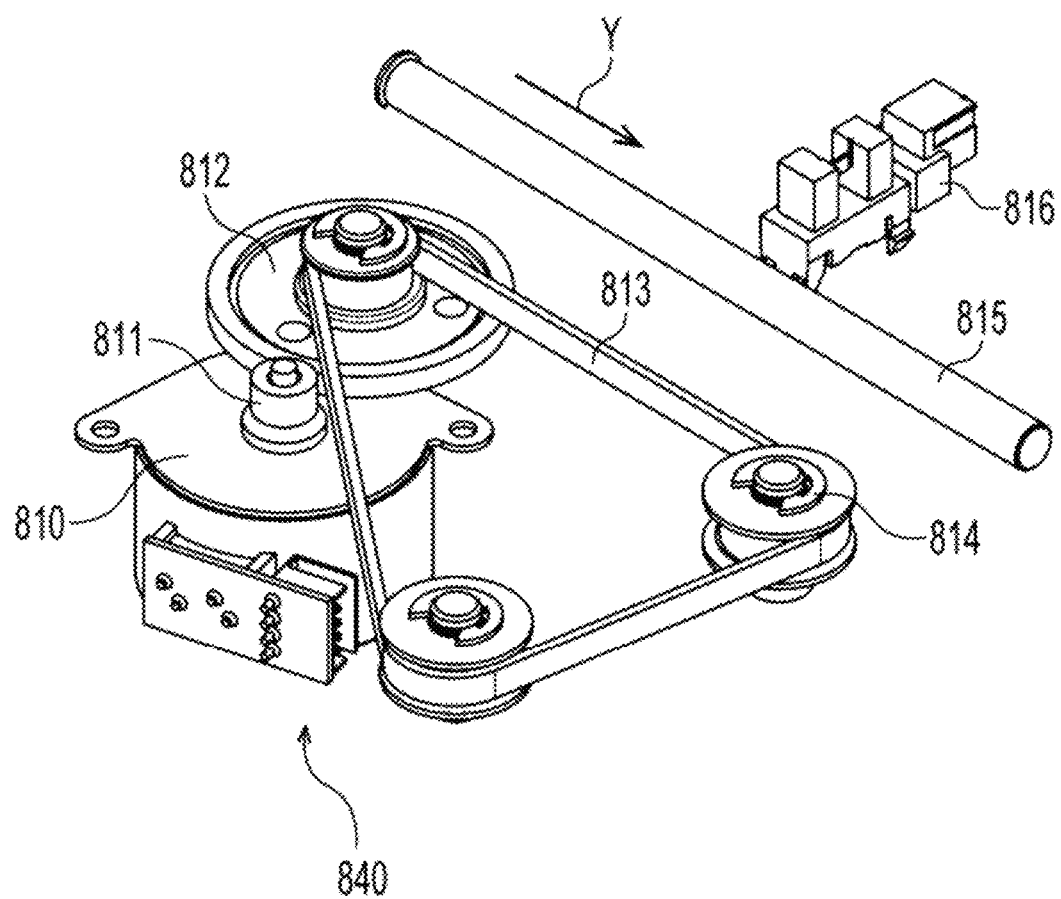
FIG. 9 is a perspective view of a shading drive portion.
Figure 10:
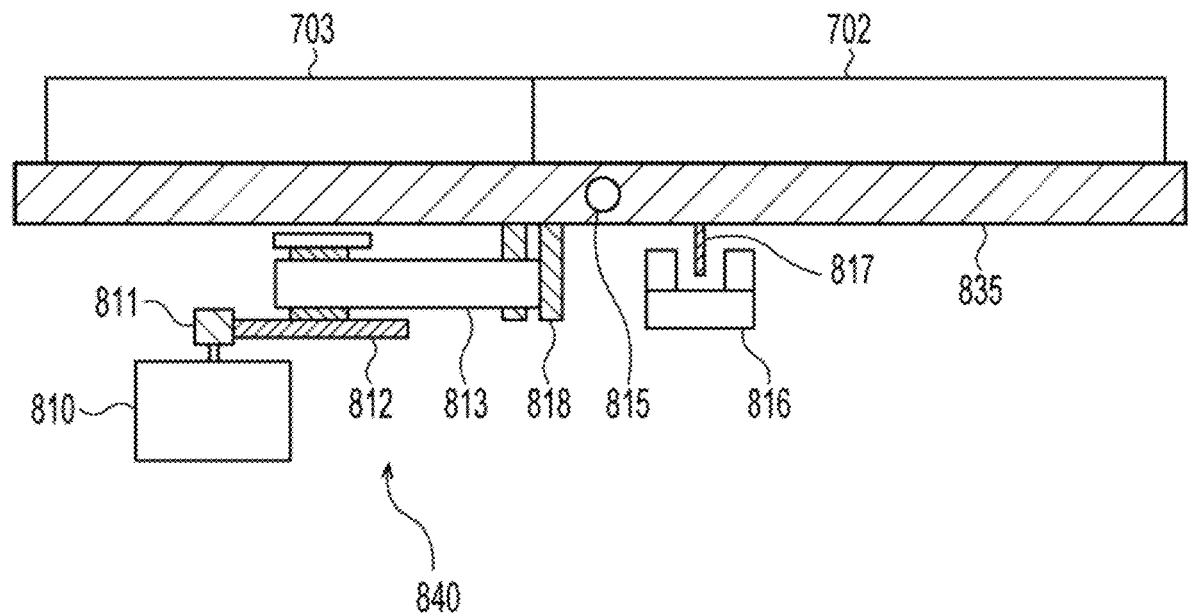
FIG. 10 is a side view of the shading drive portion.

A shading drive portion 840 is described with reference to FIG. 9 and FIG. 10. FIG. 9 is a perspective view of the shading drive portion 840. FIG. 10 is a side view of the shading drive portion 840. The shading drive portion 840 includes the shading motor 810, a motor gear 811, a gear pulley 812, a timing belt 813, idler pulleys 814, and a slide guide shaft 815. The shading drive portion 840 further includes the photosensor 816, a sensor flag 817, a belt holding portion 818, and the carriage 835.

The carriage 835 is configured to hold the CISs 702 and 703. The slide guide shaft 815 extends in the sub-scanning direction Y parallel to the conveyance direction CD of the sheet P. The slide guide shaft 815 is configured to support the carriage 835 so that the carriage 835 is slidable in the sub-scanning direction Y. The carriage 835 is provided with the belt holding portion 818. The belt holding portion 818 is configured to hold a part of the timing belt 813, and is fixed to the timing belt 813. The timing belt 813 is wound around a pulley of the gear pulley 812 and the idler pulleys 814. The idler pulleys 814 are provided so as to stretch the timing belt 813. A gear of the gear pulley 812 is configured to mesh with the motor gear 811 of the shading motor 810 serving as a drive source. A drive force of the shading motor 810 is transmitted to the timing belt 813 through intermediation of the motor gear 811 and the gear pulley 812.

When the shading motor 810 is rotated, the carriage 835 is moved in the sub-scanning direction Y through intermediation of the timing belt 813. The carriage 835 is provided with the sensor flag 817. The photosensor 816 uses the sensor flag 817 to detect transmission and blocking of light involved in movement of the carriage 835. A home position and a stop position of the carriage 835 are controlled based on a timing at which the photosensor 816 detects the sensor flag 817. The shading motor 810 is controlled based on a result of detecting the photosensor 816, to thereby be able to cause the CISs 702 and 703 to reciprocate between the reading position RP and the shading correction position SH.

The front-side reading portion 911 can continuously read the sheet P discharged from the image forming apparatus 101. In the electrophotographic image forming apparatus 101, the sheet P is conveyed from the feed cassette 113 to the discharge path 139 by a large number of rollers, and may therefore be charged with static electricity.

The sheet guide member 830 in this embodiment is formed of a conductive member, for example, a stainless steel sheet, and is grounded in order to suppress frictional static electricity generated due to rubbing against the sheet P being conveyed. The sheet guide member 830 is held in the reading box 901 for the front side together with the reading glass 704 by a holding portion 740 described below, and is grounded.

(Reading Glass Holding Portion)

Figure 11:
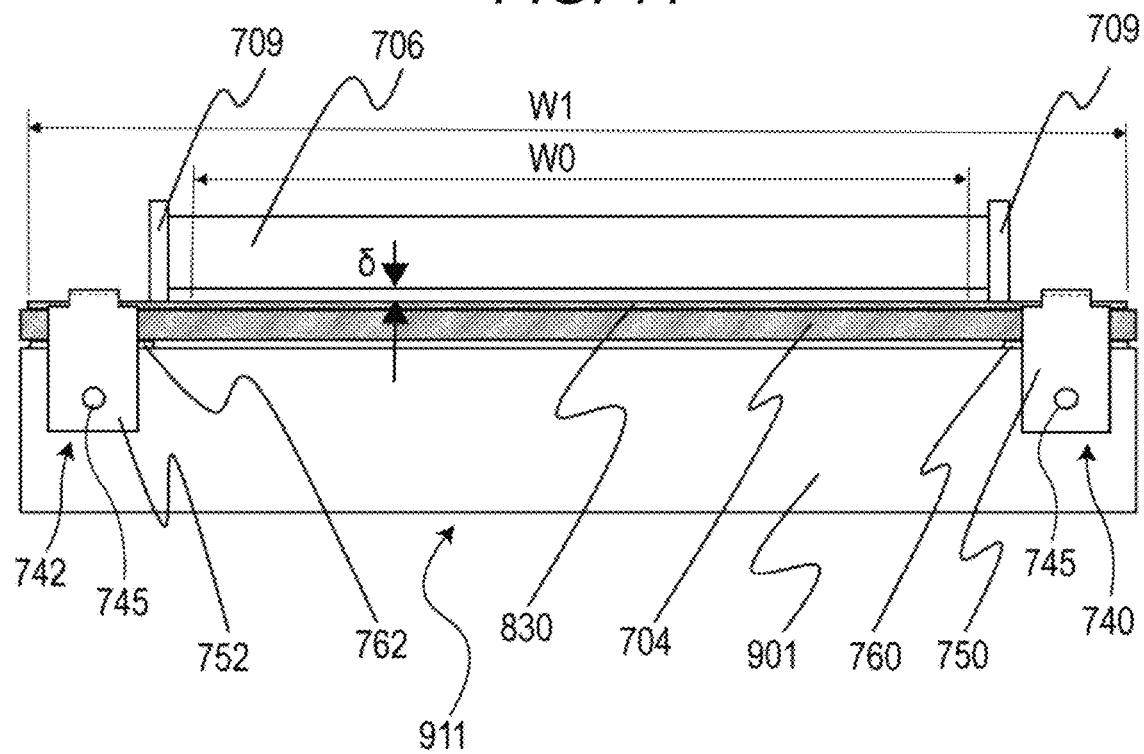
FIG. 11 is a side view of a reading portion.
Figure 12:
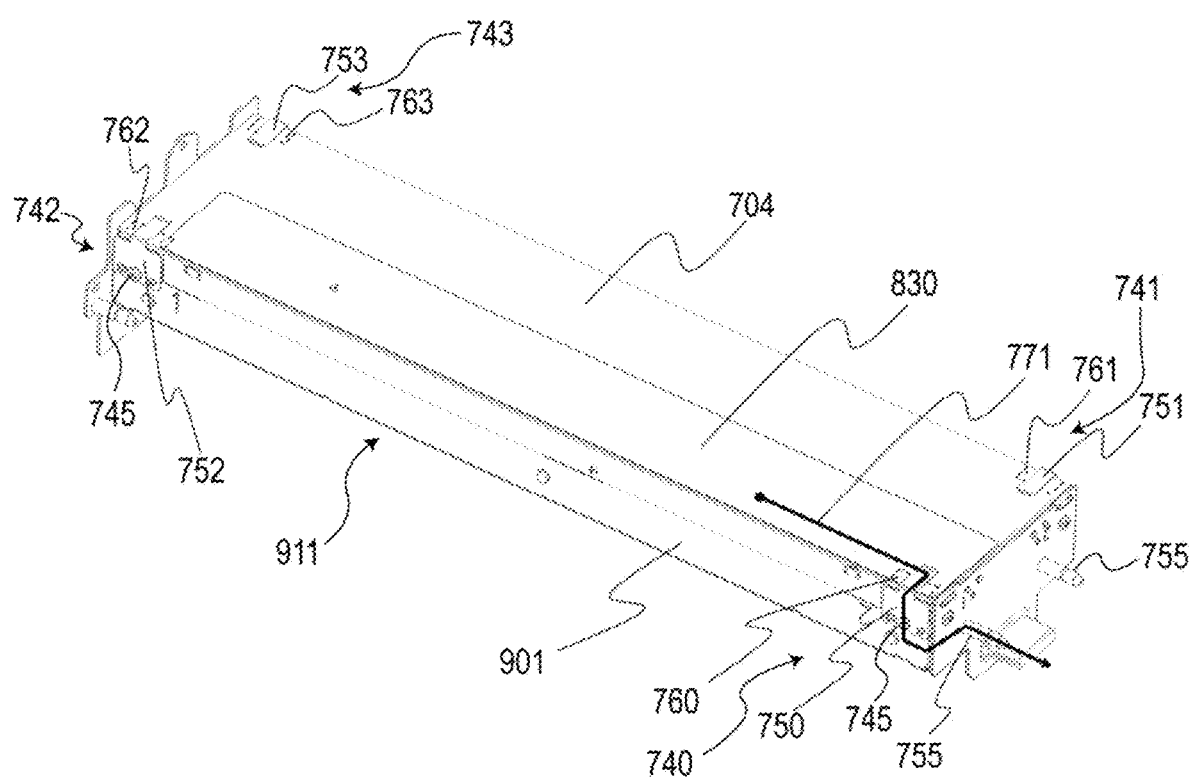
FIG. 12 is a perspective view of the reading portion.
Figure 13:
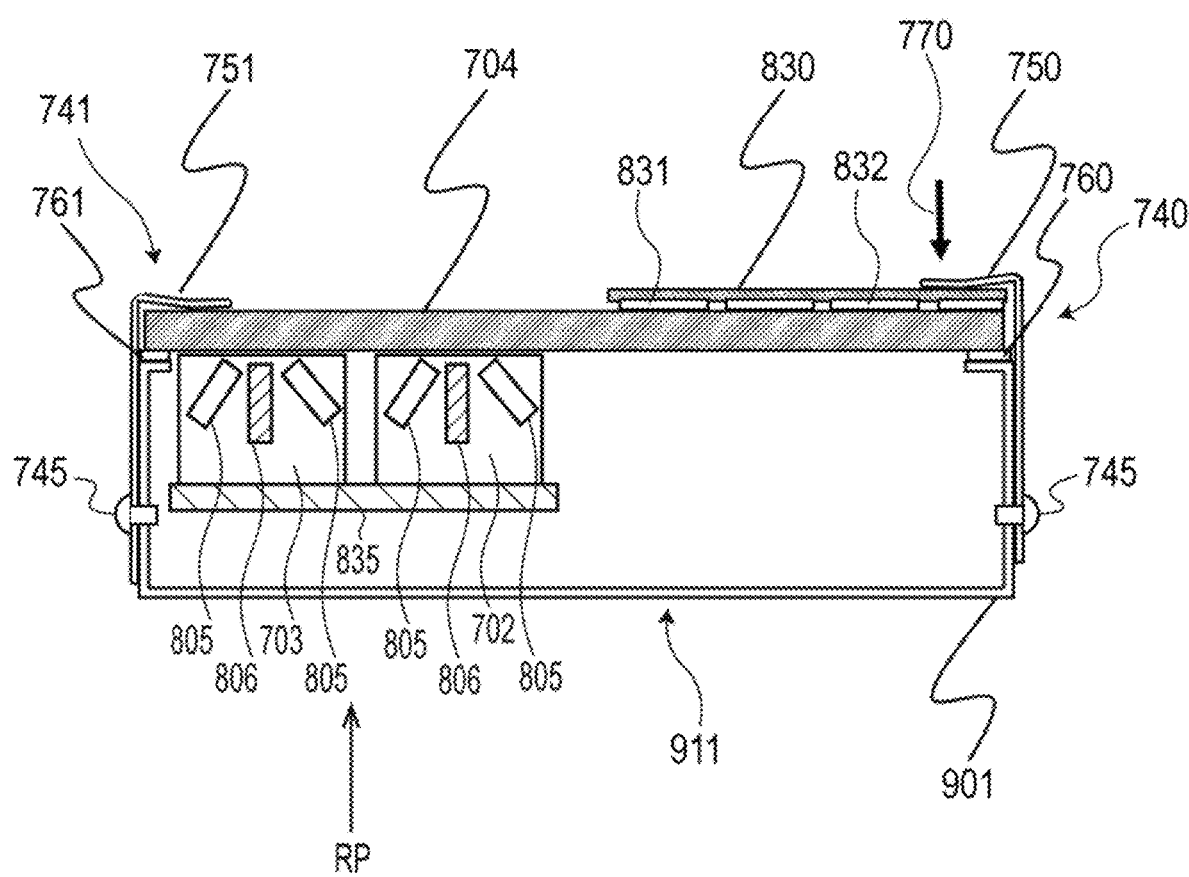
FIG. 13 is a cross-sectional view of a holding portion.

The holding portion 740 and holding portions 741, 742, and 743 that are configured to hold the transparent reading glass 704 are described with reference to FIG. 11, FIG. 12 and FIG. 13. FIG. 11 is a side view of the front-side reading portion 911. FIG. 12 is a perspective view of the front-side reading portion 911. FIG. 13 is a cross-sectional view of the holding portions 740 and 741. The reading box 901 for the front side, which is a casing having conductivity, is a box-shaped structure formed of a metal plate (conductive member) capable of electrical conduction, and includes the CISs 702 and 703 in its inside. The holding portions 740, 741, 742, and 743 are formed of glass seat surfaces 760, 761, 762, and 763 and pressing members 750, 751, 752, and 753, respectively.

The glass seat surfaces 760, 761, 762, and 763 are arranged at four corners on the reading surface (upper surface) side of the reading box 901 for the front side. The glass seat surfaces 760, 761, 762, and 763 are portions protruding toward the inside of the reading box 901 for the front side. The reading glass 704 is supported by the glass seat surfaces 760, 761, 762, and 763. The glass seat surfaces 760, 761, 762, and 763 are accurately arranged on substantially the same plane, and hence the reading glass 704 mounted on the glass seat surfaces 760, 761, 762, and 763 is also maintained in a flat state.

The pressing members 750, 751, 752, and 753 are each formed of a metal plate having a spring property, for example, a leaf spring. The reading glass 704 is held against the reading box 901 for the front side with urging forces of the pressing members 750, 751, 752, and 753. As can be understood from FIG. 11, FIG. 12, and FIG. 13, the pressing members 750, 751, 752, and 753 each have a substantially L-shaped cross-sectional shape. As illustrated in FIG. 13, one end portion of the pressing member 750 sandwiches the conductive sheet guide member 830 with the reading glass 704, and applies the urging force in the direction indicated by an arrow 770 by being brought into abutment with the sheet guide member 830. Another end portion of the pressing member 750 is fixed to the reading box 901 for the front side. The pressing member (holding unit) 750 not only has a holding function of holding the reading glass 704, but also forms a part of an electricity supply path (static electricity elimination path) 771 illustrated in FIG. 12 for providing passage of static electricity due to being made of metal and having conductivity. As indicated as the electricity supply path 771 in FIG. 12, the static electricity of the sheet P is transmitted from the conductive sheet guide member 830 to the reading box 901 for the front side, which is the casing made of metal, through the metallic pressing member 750. The static electricity is further transmitted to a main body 200a of the adjustment unit 200 illustrated in FIG. 3 through a positioning pin 755 made of metal and protruding from the reading box 901 for the front side.

The pressing member 750 applies an urging force equal to or greater than a predetermined force to the sheet guide member 830 so as to reliably bring the pressing member 750 into contact with the sheet guide member 830. The pressing members 751, 752, and 753 each apply an urging force equal to or greater than a predetermined force to the reading glass 704 to hold the reading glass 704 against the reading box 901 for the front side. The pressing members 750, 751, 752, and 753 are fixed to the reading box 901 for the front side by screws 745. The pressing member 750 is reliably electrically connected to the reading box 901 for the front side by the screw 745 made of metal. The positioning pin 755 made of metal and protruding from the reading box 901 for the front side is inserted into a hole (not shown) of the main body 200a of the adjustment unit 200, and is fixed thereto. The holes (not shown) provided to the main body 200a are formed in a frame made of metal, and hence the reading box 901 for the front side is reliably electrically connected to the main body 200a of the adjustment unit 200 through intermediation of the positioning pin 755. The electricity supply path 771 for the static electricity is formed in this manner, and hence the static electricity of the sheet P is transmitted to the main body 200a of the adjustment unit 200 through the electricity supply path 771 so as to prevent the static electricity of the sheet P from being accumulated in the front-side reading portion 911.

The sheet P being conveyed is subjected to the conveyance while being in contact with the sheet guide member 830, to thereby efficiently transfer the static electricity charged on the sheet P to the sheet guide member 830. The sheet guide member 830 extends to the upstream portion of the reading position RP, and hence the static electricity of the sheet P can be transferred to the sheet guide member 830 until immediately before the image reading. In addition, the static electricity can be eliminated from the entire width of the sheet P. The static electricity transferred to the sheet guide member 830 flows to the main body 200a through the pressing member 750.

The sheet P is conveyed toward a gap $\delta$ between the reading glass 704 and the backing roller 706, which is illustrated in FIG. 11. The front-side reading portion 911 reads the image on the sheet P being conveyed through the gap $\delta$. The sheet P is conveyed within a sheet conveyance area having a sheet-passing width W0, which is provided between the abutment rollers 709 provided at the both end portions of the backing roller 706. A width W1 of the sheet guide member 830 is wider than the sheet-passing width W0 (W1>W0). The sheet guide member 830 extends to the outside of the sheet conveyance area having the sheet-passing width W0. The pressing member 750 is arranged outside the sheet conveyance area having the sheet-passing width W0, and holds the sheet guide member 830.

The abutment rollers 709 and the pressing member 750 that apply loads to the reading glass 704 are arranged in close proximity to each other on the outside of the sheet conveyance area having the sheet-passing width W0, to thereby suppress deformation of the reading glass 704 and ensure flatness. The pressing member 750 may be in abutment with the sheet guide member 830 on the outside of the abutment rollers 709. The abutment rollers 709 are in abutment with the reading glass 704 with a predetermined pressurizing force. The pressing member 750 urges the reading glass 704 with the urging force equal to or greater than the predetermined force. The glass seat surfaces 760, 761, 762, and 763 on which the reading glass 704 is placed are arranged at or near positions opposed to one end portion of the pressing members 750, 751, 752, and 753 that apply the urging forces, respectively. The glass seat surfaces 760, 761, 762, and 763 receive the pressurizing force of the abutment rollers 709 and the urging forces of the pressing members 750, 751, 752, and 753, to thereby ensure the flatness of the reading glass 704.

Assuming that the pressing member 750 is arranged in the sheet conveyance area having the sheet-passing width W0, the reading glass 704 is deformed by the urging force of the pressing member 750, and the gap δ between the reading glass 704 and the backing roller 706 is partially widened. When the gap δ is widened, a distance between the sheet P and the CISs 702 and 703 may increase to cause the sheet P to deviate from focus positions of the CISs 702 and 703. When the sheet P deviates from the focus positions of the CISs 702 and 703, the quality of the image read by the CISs 702 and 703 deteriorates. In view of this, in this embodiment, the pressing member 750 is arranged outside the sheet conveyance area having the sheet-passing width W0.

In order to ensure the flatness of the reading glass 704, the glass seat surfaces 760, 761, 762, and 763 are formed on the same plane with high accuracy. In order to ensure the flatness of the reading glass 704, the pressing members 750, 751, 752, and 753 and the abutment rollers 708 and 709 are arranged in close proximity to each other on the outside of the sheet conveyance area. The pressing member 750 forms an electricity supply path for the static electricity, and hence the static electricity is reliably eliminated from the sheet P. Therefore, the sheet P charged with the static electricity is attracted to the front-side reading portion 911. As a result, conveyance resistance is generated due to the charged sheet, and it is possible to prevent the occurrences of a jam and conveyance unevenness due to the conveyance resistance.

The conductive sheet guide member 830 having the width W1 wider than the sheet-passing width W0 of the sheet conveyance area is arranged on an upstream side portion of the front-side reading portion 911 in the conveyance direction CD of the sheet P. The conductive pressing member 750 is arranged outside the sheet conveyance area. The pressing member 750 holds the reading glass 704 through use of the sheet guide member 830. According to this embodiment, the sheet guide member 830 can be reliably grounded with a simple structure without deterioration of the flatness of the reading glass 704.

(Feedback Configuration of Front/Back Registration)

Measurement to be performed by the front/back registration portion 700 and a feedback destination of a result of the measurement are described. FIG. 14 is a table for showing the sheet library 900. As shown in FIG. 14, a first geometric adjustment value 921 for the front side and a second geometric adjustment value 922 for the back side are set in association with a sheet type 910. FIG. 15 is a view for illustrating a sheet library editing screen 1001 displayed on the operation portion 180. The user can select and set the sheet type 910 from the sheet library editing screen 1001. When the image forming apparatus 101 receives a request from a "PRINT POSITION ADJUSTMENT" button 1002 on the sheet library editing screen 1001 illustrated in FIG. 15 through an operation performed on the operation portion 180 by the user, patch images 820 illustrated in FIG. 16A and FIG. 16B serving as the chart for adjustment are formed on the sheet P.

Figure 16A:
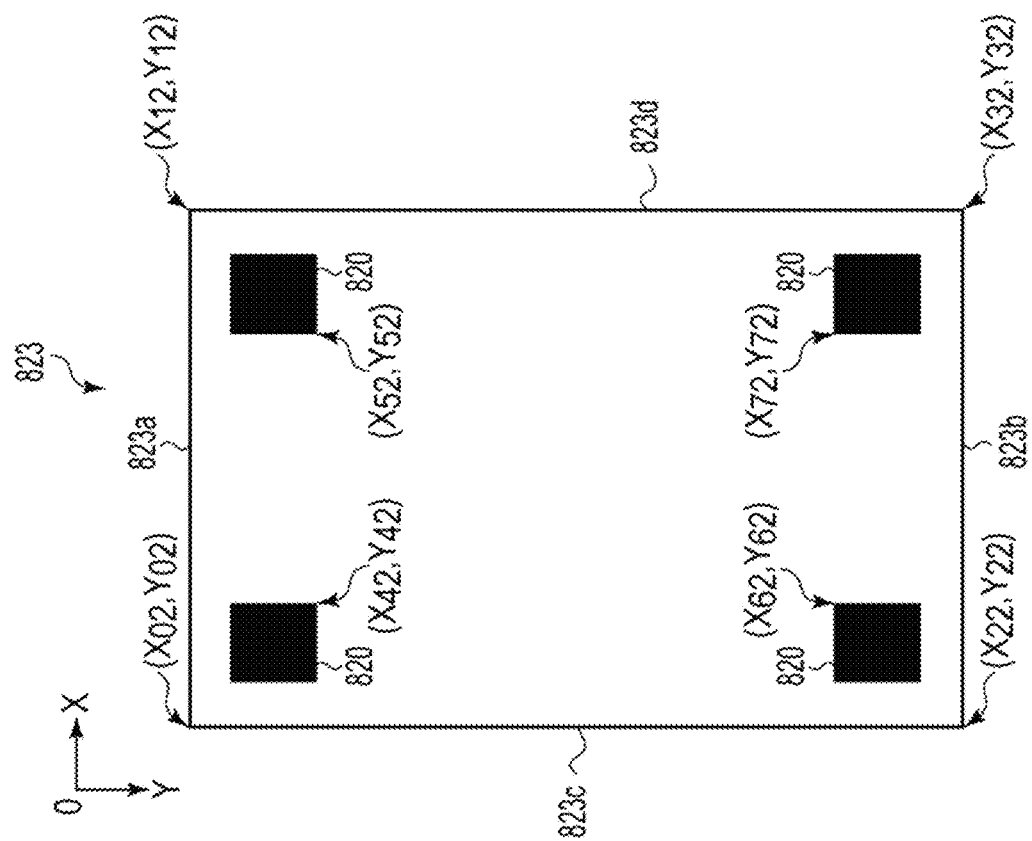
FIG. 16A and FIG. 16B are views for illustrating patch images formed on a sheet.
Figure 16B:
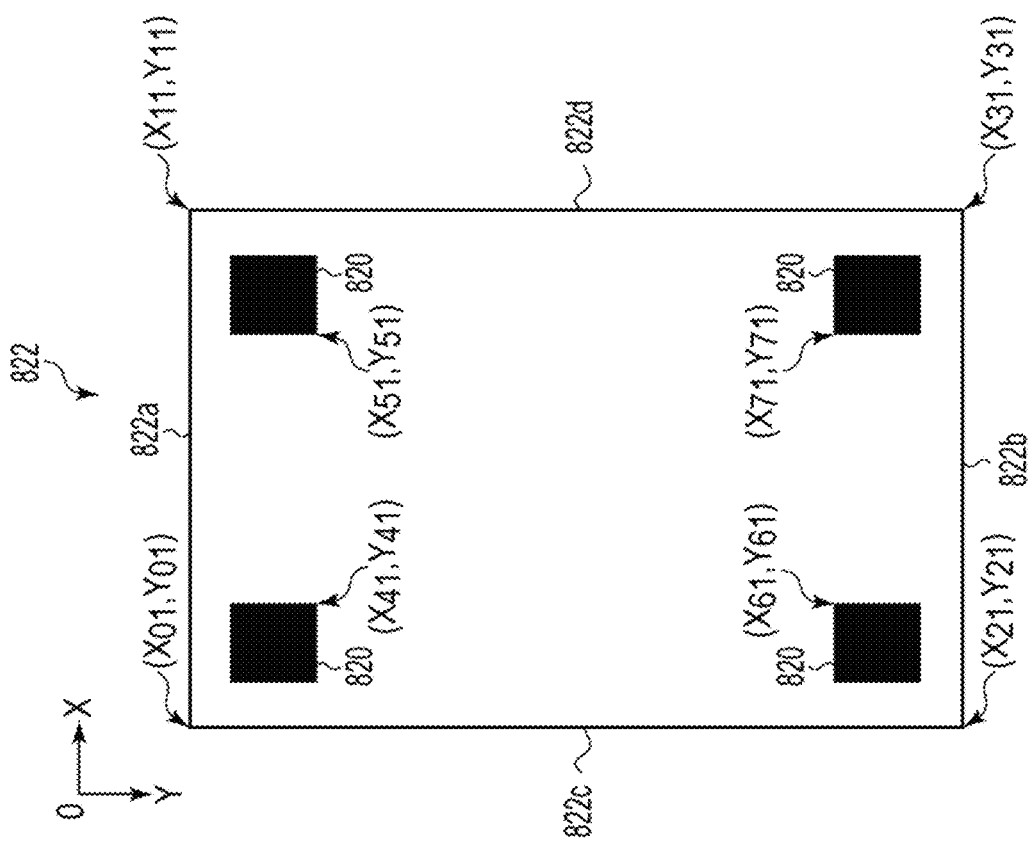

FIG. 16A and FIG. 16B are views for illustrating the patch images 820 formed on the sheet P. The front/back registration portion 700 reads the front side of the sheet P on which the patch images 820 serving as the chart for adjustment have been formed by the CISs 702 and 703 of the reading box 901 for the front side while conveying the sheet P by the conveyance roller pairs 211, 212, and 213. The front side of the sheet P is continuously read by the CISs 702 and 703, and read line images are connected to combine image data. The measurement is performed based on the combined image. In the same manner, the CISs 702 and 703 of the reading box 902 for the back side read the back side of the sheet P being conveyed by the conveyance roller pairs 211, 212, and 213.

FIG. 16A is a view for illustrating the front-side measurement pattern image 822 obtained by reading the front side of the sheet P on which the patch images 820 have been formed by the CISs 702 and 703 of the reading box 901 for the front side. The four patch images 820 are formed in the four corner areas of the front-side measurement pattern image 822. The front-side measurement pattern image 822 includes a leading edge 822a and a trailing edge 822b in the conveyance direction CD of the sheet P and a left-side edge 822c and a right-side edge 822d along the conveyance direction CD. The conveyance direction CD of the sheet P is set as the sub-scanning direction Y, and a direction perpendicular to the sub-scanning direction Y is set as the main scanning direction X.

The image processing portion 260 calculates detection coordinates $(X_{01}, Y_{01})$, $(X_{11}, Y_{11})$, $(X_{21}, Y_{21})$, and $(X_{31}, Y_{31})$ of the sheet P from the front-side measurement pattern image 822. The image processing portion 260 calculates detection coordinates $(X_{41}, Y_{41})$, $(X_{51}, Y_{51})$, $(X_{61}, Y_{61})$, and $(X_{71}, Y_{71})$ of the patch images 820 from the front-side measurement pattern image 822. The image processing portion 260 measures a distortion amount of the image on the front side and a position misregistration amount between the sheet P and the image based on the detection coordinates $(X_{01}, Y_{01})$ to $(X_{71}, Y_{71})$. The image processing portion 260 calculates the first geometric adjustment value 921 shown in FIG. 14, which enables shape correction instruction for the image shape correction portion 320, based on the distortion amount and the position misregistration amount of the image on the front side. The first geometric adjustment value 921 includes a lead position, a side position, a main scanning magnification, a sub-scanning magnification, a right angle property, and a rotation amount.

FIG. 16B is a view for illustrating the back-side measurement pattern image 823 obtained by reading the back side of the sheet P on which the patch images 820 have been formed by the CISs 702 and 703 of the reading box 902 for the back side. The four patch images 820 are formed in the four corner areas of the back-side measurement pattern image 823. The back-side measurement pattern image 823 includes a leading edge 823a and a trailing edge 823b in the conveyance direction CD of the sheet P and a left-side edge 823c and a right-side edge 823d along the conveyance direction CD.

The image processing portion 260 calculates detection coordinates $(X_{02}, Y_{02})$, $(X_{12}, Y_{12})$, $(X_{22}, Y_{22})$, and $(X_{32}, Y_{32})$ of the sheet P from the back-side measurement pattern image 823. The image processing portion 260 calculates detection coordinates $(X_{42}, Y_{42})$, $(X_{52}, Y_{52})$, $(X_{62}, Y_{62})$, and $(X_{72}, Y_{72})$ of the patch images 820 from the back-side measurement pattern image 823. The image processing portion 260 measures a distortion amount of the image on the back side and a position misregistration amount between the sheet P and the image based on the detection coordinates $(X_{02}, Y_{02})$ to $(X_{72}, Y_{72})$. The image processing portion 260 calculates the second geometric adjustment value 922 shown in FIG. 14, which enables shape correction instruction for the image shape correction portion 320, based on the distortion amount and the position misregistration amount of the image on the back side. The second geometric adjustment value 922 includes a lead position, a side position, a main scanning magnification, a sub-scanning magnification, a right angle property, and a rotation amount.

The first geometric adjustment value 921 and the second geometric adjustment value 922 calculated by the image processing portion 260 are transmitted to the sheet library 900 in the image forming apparatus 101 through the communication portion 250. The first geometric adjustment value 921 and the second geometric adjustment value 922 are stored in the sheet library 900 as a parameter for the front side and a parameter for the back side. In this manner, setting values are stored in the sheet library 900 for each sheet type 910. A print image with the front and back print positions corrected with high accuracy can be output by reading the setting values from the sheet library 900 based on the sheet type 910 of a sheet on which a print job is to be executed and correcting the image position and image distortion. In this case, the front-side measurement pattern image 822 and the back-side measurement pattern image 823 which have been exemplified in this description may be measured before the execution of the print job, or may be automatically measured at a predetermined timing as calibration during the execution of the print job.

(Control Operation)

Figure 17:
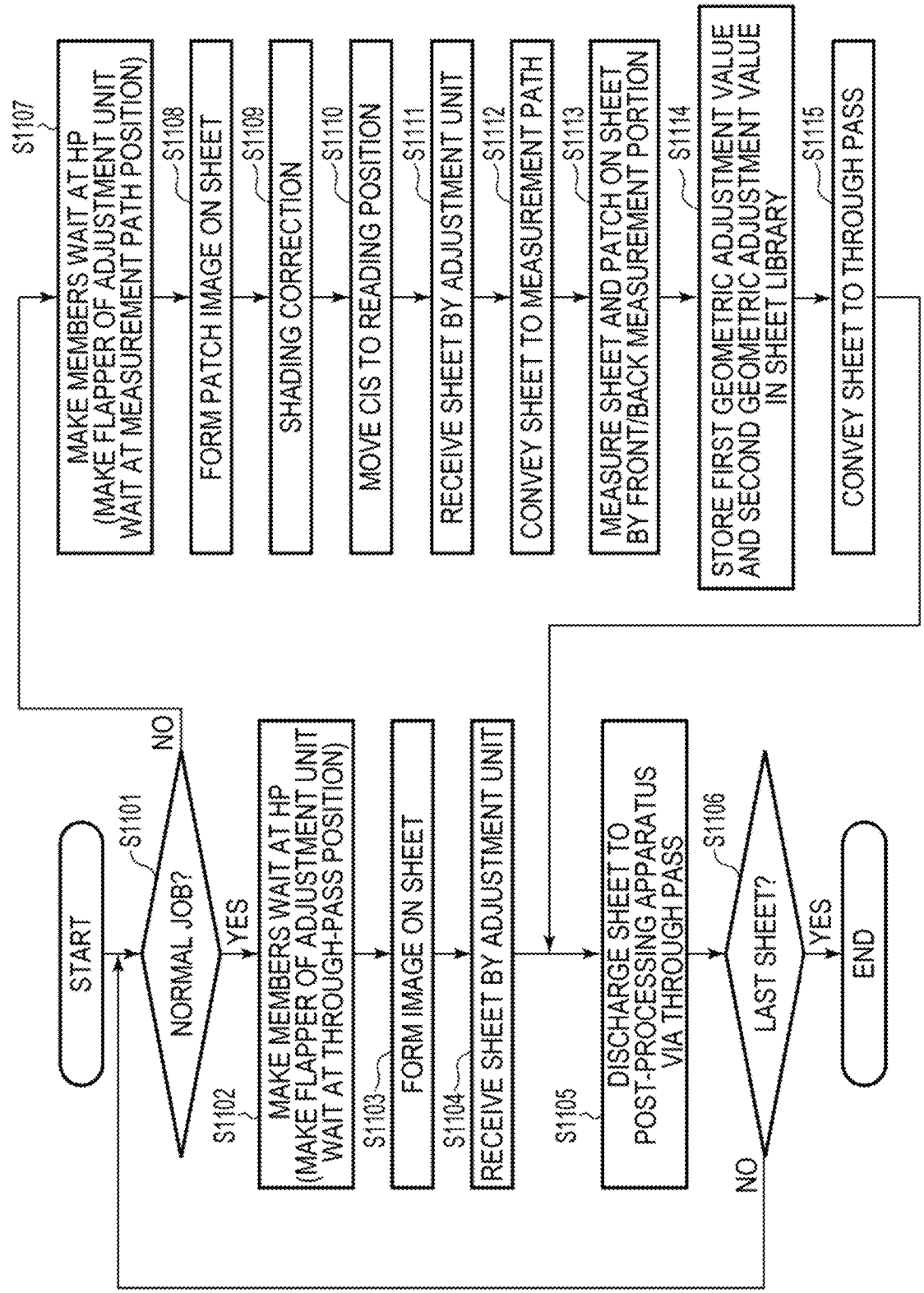
FIG. 17 is a flow chart for illustrating control operation for conveying the sheet.

Now, a control operation for conveying the sheet P in the image forming apparatus 101 and the adjustment unit 200 is described with reference to FIG. 17. FIG. 17 is a flow chart for illustrating the control operation for conveying the sheet P. The control portion 251 executes the control operation according to a program stored in an internal memory (not shown). When a job is input from the operation portion 180 by the user, the control portion 251 starts the control operation. The control portion 251 determines whether or not the job is a normal print job (Step S1101). When the job is a normal print job (YES in Step S1101), the control portion 251 makes each member of the image forming apparatus 101 and the adjustment unit 200 wait at the home position (HP) (Step S1102). At this time, in order to guide the sheet P to the through pass 230 in the adjustment unit 200, the control portion 251 makes the flapper 221 wait in a downward state (at a position for the through pass) (Step S1102).

The image forming apparatus 101 forms an image on the sheet P (Step S1103). The adjustment unit 200 receives the sheet P having the image formed thereon by the image forming apparatus 101 (Step S1104). The control portion 251 controls the conveyance motor 252 to cause the sheet P to be passed through the through pass 230 and discharged to the post-processing apparatus 600 by the first conveyance rollers 201, the second conveyance rollers 202, the third conveyance rollers 203, and the fourth conveyance rollers 204 (Step S1105). The control portion 251 determines whether or not the sheet P is the last sheet (Step S1106). When the sheet P is not the last sheet (NO in Step S1106), the control portion 251 returns the processing to Step S1101. When the sheet P is the last sheet (YES in Step S1106), the control portion 251 ends the control operation.

Meanwhile, when the user selects the "PRINT POSITION ADJUSTMENT" button 1002 by selecting the sheet type 910 from the sheet library 900 through the operation portion 180, a front/back registration job is input. When the job is a front/back registration job (NO in Step S1101), the control portion 251 makes each member of the image forming apparatus 101 and the adjustment unit 200 wait at the home position (HP) (Step S1107). At this time, in order to guide the sheet P to the measurement path 231 in the adjustment unit 200, the control portion 251 makes the flapper 221 wait in an upward state (at a position for the measurement path) (Step S1107).

The image forming apparatus 101 forms the patch images 820 serving as the chart for adjustment on both sides of the sheet P (Step S1108). The control portion 251 moves the CISs 702 and 703 to the shading correction position SH before reading both sides of the sheet P, and executes the shading correction (Step S1109). The control portion 251 moves the CISs 702 and 703 to the reading position RP (Step S1110). The adjustment unit 200 receives the sheet P having the patch images 820 formed thereon (Step S1111). The sheet P conveyed to the adjustment unit 200 is conveyed to the measurement path 231 by the flapper 221 (Step S1112). The sheet P is conveyed to the front/back registration portion 700 by the conveyance roller pairs 205, 206, 207, 208, 209, and 210.

The control portion 251 reads the sheet P and the patch images 820 formed on both sides of the sheet P by the CISs 702 and 703 of the reading box 901 for the front side and the reading box 902 for the back side, respectively (Step S1113). The image processing portion 260 obtains the front-side measurement pattern image 822 and the back-side measurement pattern image 823 from the reading results obtained by CISs 702 and 703. The front/back registration portion 700 performs line image composition with high definition, and measures print misregistration of the patch images 820 on the sheet P and the shape of the sheet P. The image processing portion 260 calculates the first geometric adjustment value 921 and the second geometric adjustment value 922 from the front-side measurement pattern image 822 and the back-side measurement pattern image 823. The image processing portion 260 stores the first geometric adjustment value 921 and the second geometric adjustment value 922 in the sheet library 900 of the image forming apparatus 101 through the communication portion 250 (Step S1114). Thus, the print position adjustment for front/back registration adjustment is brought to an end.

The sheet P that has passed through the front/back registration portion 700 is conveyed to the through pass 230 by the conveyance roller pair 214 (Step S1115). After that, the sheet P is conveyed to the discharge path 232 by the third conveyance rollers 203, and is discharged to the post-processing apparatus 600 by the fourth conveyance rollers 204 (Step S1105). The control portion 251 determines whether or not the sheet P is the last sheet (Step S1106), and when the sheet P is the last sheet (YES in Step S1106), the control portion 251 ends the control operation.

According to this embodiment, it is possible to suppress the occurrence of a jam due to the white reference plates 831 and 832 provided to the surface of the reading glass 704 on the measurement path (conveyance path) 231 side.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2020-091505, filed May 26, 2020, and No. 2021-010202, filed Jan. 26, 2021, which are hereby incorporated by reference herein in their entirety.

What is claimed is:

1. An image forming system, comprising:
an image forming portion configured to form an image on a first sheet;
a conveyance unit configured to convey the first sheet on which the image has been formed by the image forming portion;
a transparent member provided downstream of the conveyance unit in a conveyance direction in which the first sheet is conveyed;
a reading unit including a reading sensor configured to read the image on the first sheet through the transparent member at a reading position in the conveyance direction;
a reference member provided on the transparent member on a side opposite to the reading sensor with respect to the transparent member;
a guide member configured to guide, to the reading position, the first sheet conveyed in the conveyance direction, the reference member being covered with the guide member; and
a controller configured to perform shading correction on a result of reading the first sheet based on image data obtained by the reading unit reading the reference member through the transparent member, and to control, based on an image subjected to the shading correction, a geometric characteristic of the image to be formed on a second sheet by the image forming portion,
wherein the image forming portion is configured to form an image on the second sheet based on the geometric characteristic controlled by the controller.

2. The image forming system according to claim 1, wherein the conveyance unit includes a first roller, and a second roller configured to form a nip portion between the second roller and the first roller, and
wherein an upstream edge of the guide member in the conveyance direction is located below a common tangent of the first roller and the second roller at the nip portion.

3. The image forming system according to claim 1, wherein the conveyance unit is provided upstream of the transparent member in the conveyance direction,
wherein the image forming system further comprises a conveyance guide configured to guide the first sheet, which is being conveyed to the conveyance unit, to the transparent member, the conveyance guide being provided between the conveyance unit and an upstream edge of the transparent member in the conveyance direction, and
wherein the upstream edge of the guide member is in contact with a downstream edge of the conveyance guide in the conveyance direction.

4. The image forming system according to claim 1, wherein the reading unit includes a plurality of reading sensors arranged in a staggered manner, and
wherein the reference member includes a plurality of reference members arranged in the staggered manner in the same manner as the plurality of reading sensors so as to enable the plurality of reading sensors to read the plurality of reference members.

5. The image forming system according to claim 1, wherein the reference member is arranged upstream of the reading position in the conveyance direction, and
wherein the reading unit is movable between the reading position and another reading position at which the reading unit reads the reference member through the transparent member.

6. The image forming system according to claim 1, wherein the reference member is a white reference plate.

7. The image forming system according to claim 1, wherein the reading sensor is a contact image sensor.

8. The image forming system according to claim 1, wherein the guide member is formed of a conductive member, and is grounded.

9. The image forming system according to claim 8, further comprising:
a casing, which has conductivity, is provided with the reading unit, and is configured to hold the transparent member; and
a holding unit, which has conductivity, and is configured to urge the guide member against the transparent member,
wherein the guide member is grounded through the holding unit and the casing.

10. The image forming system according to claim 9, wherein the holding unit is formed of a leaf spring made of metal.

11. The image forming system according to claim 9, wherein, in a width direction perpendicular to the conveyance direction, the guide member has a width wider than a width of a sheet conveyance area through which the first sheet is conveyed, and
wherein the holding unit is in abutment with the guide member outside the sheet conveyance area in the width direction.

12. The image forming system according to claim 9, further comprising:
an opposed member, which is provided on a side opposite to the reading unit with respect to the transparent member, and is arranged so as to be opposed to the reading unit located at the reading position; and
an abutment portion, which is provided at each of both end portions of the opposed member in a width direction perpendicular to the conveyance direction, and is in abutment with the transparent member to secure a gap between the transparent member and the opposed member,
wherein the holding unit is arranged in close proximity to the abutment portion.

* * * * *